US012615490B2

(12) United States Patent (10) Patent No.: US 12,615,490 B2

Yim et al. (45) Date of Patent: Apr. 28, 2026

(54) ELECTRONIC DEVICE FOR CONFIGURING GEOFENCE AND OPERATION METHOD THEREOF

(71) Applicant: SAMSUNG ELECTRONICS CO., LTD., Suwon-si (KR)

(72) Inventors: Sunggyu Yim, Suwon-si (KR); Myeongwoo Koo, Suwon-si (KR); Yunhwa Seo, Suwon-si (KR); Sunggyu Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 279 days.

(21) Appl. No.: 18/339,651

(22) Filed: Jun. 22, 2023

(65) Prior Publication Data

US 2023/0336940 A1 Oct. 19, 2023

Related U.S. Application Data

(63) Continuation of application No. PCT/KR2022/002413, filed on Feb. 18, 2022.

(30) Foreign Application Priority Data

Feb. 19, 2021 (KR) ......................... 10-2021-0022651

(51) Int. Cl.
*H04W 4/021* (2018.01)
(52) U.S. Cl.
CPC ................................... *H04W 4/022* (2013.01)
(58) Field of Classification Search
CPC ....... H04W 4/022; H04W 4/02; H04W 4/021; H04W 4/023; H04W 4/026

USPC ......................... 455/414.1–414.2, 456.1–457
See application file for complete search history.

(56) References Cited

U.S. PATENT DOCUMENTS

| | | | |
|---|---|---|---|
| 9,998,866 | B2 | 6/2018 | Natucci, Jr. et al. |
| 10,240,932 | B2 | 3/2019 | Friedler et al. |
| 10,832,285 | B2 | 11/2020 | Meredith et al. |
| 10,996,310 | B2 | 5/2021 | Ng et al. |
| 11,243,288 | B2 | 2/2022 | Lin |

(Continued)

FOREIGN PATENT DOCUMENTS

| | | |
|---|---|---|
| KR | 101187028 B1 | 9/2012 |
| KR | 101570715 B1 | 11/2015 |

(Continued)

OTHER PUBLICATIONS

Korean Notice of Patent Grant dated Feb. 2, 2026 for KR Application No. 10-2021-0022651.

*Primary Examiner* — Michael Y Mapa

(74) *Attorney, Agent, or Firm* — Nixon & Vanderhye P.C.

(57) ABSTRACT

An electronic device may include a communication circuit and a processor electrically connected to the communication circuit, where the processor may be configured to receive location information of the electronic device, identify whether an amount of the location information is greater than or equal to a reference amount, and change a geofence configuration based on a location accuracy radius of the location information, in case that the location information amount is equal to or greater than the reference amount, and the location accuracy radius may be determined based on a probability that the electronic device is actually located in a specific area.

18 Claims, 15 Drawing Sheets

(56) References Cited

U.S. PATENT DOCUMENTS

| | | | |
|---|---|---|---|
| 2013/0099977 A1 | 4/2013 | Sheshadri et al. | |
| 2013/0225196 A1* | 8/2013 | James | H04W 4/022 |
| | | | 455/456.1 |
| 2014/0155094 A1 | 6/2014 | Zises | |
| 2014/0370910 A1* | 12/2014 | Natucci, Jr. | H04W 4/021 |
| | | | 455/456.1 |
| 2019/0261131 A1* | 8/2019 | Keil | H04W 4/022 |

FOREIGN PATENT DOCUMENTS

| | | | |
|---|---|---|---|
| KR | 20160019899 A | 2/2016 |
| KR | 101678618 B1 | 11/2016 |
| KR | 102115712 B1 | 5/2020 |
| KR | 102378614 B1 | 3/2022 |

* cited by examiner

400

410

420

| Latitude | Latitude | Accuracy | Provider | Timestamp | fence ID |
|---|---|---|---|---|---|
| 37.265251 | 127.062374 | 23 | gps | 2020-09-09 20:11 | 2 |
| 37.265232 | 127.062324 | 11 | gps | 2020-09-09 20:17 | 2 |
| 37.271587 | 127.063437 | 5 | gps | 2020-09-09 20:22 | 2 |
| 37.274639 | 127.060997 | 1899.999 | cell | 2020-09-09 20:26 | 2 |
| 37.27434 | 127.061844 | 104.1 | cell | 2020-09-09 20:27 | 2 |
| 37.274193 | 127.06161 | 13.49 | wifi | 2020-09-09 20:33 | 2 |
| 37.274198 | 127.061641 | 15.335 | wifi | 2020-09-09 20:38 | 2 |
| 37.274192 | 127.061615 | 13.44 | wifi | 2020-09-09 20:44 | 2 |
| 37.27419 | 127.061638 | 13.39 | wifi | 2020-09-09 20:50 | 2 |
| 37.274182 | 127.061638 | 17.74 | wifi | 2020-09-09 20:56 | 2 |
| 37.274147 | 127.061709 | 18.941999 | wifi | 2020-09-09 21:07 | 2 |
| 37.274183 | 127.061595 | 14.777 | wifi | 2020-09-09 21:13 | 2 |
| 37.274181 | 127.061604 | 15.431 | wifi | 2020-09-09 21:19 | 2 |
| 37.274185 | 127.061594 | 14.476 | wifi | 2020-09-09 21:24 | 2 |
| 37.274184 | 127.061597 | 14.843 | wifi | 2020-09-09 21:30 | 2 |
| 37.274178 | 127.061606 | 15.562 | wifi | 2020-09-09 21:36 | 2 |
| 37.274179 | 127.061604 | 15.194 | wifi | 2020-09-09 21:42 | 2 |
| 37.274182 | 127.061599 | 14.902 | wifi | 2020-09-09 21:48 | 2 |
| 37.274181 | 127.0616 | 15.197 | wifi | 2020-09-09 22:15 | 2 |
| 37.274639 | 127.060997 | 1899.999 | cell | 2020-09-10 10:03 | 2 |
| 37.272972 | 127.061117 | 34.695877 | gps | 2020-09-10 10:05 | 2 |

FIG.5A

| LOCATION<br>ACCURACY<br>(METER) |
|---|
| 23 |
| 11 |
| 5 |
| 104.099998 |
| 13.49 |
| 15.335 |
| 13.44 |
| 13.39 |
| 17.74 |
| 18.941999 |
| 14.777 |
| 15.431 |
| 14.476 |
| 14.843 |
| 15.562 |
| 15.194 |
| 14.902 |
| 15.197 |
| 34.695877 |

| | |
|---|---|
| MEDIAN | 15.194 |
| MEAN VALUE | 20.5534 |

ELECTRONIC DEVICE FOR CONFIGURING GEOFENCE AND OPERATION METHOD THEREOF

CROSS-REFERENCE TO RELATED APPLICATIONS

This application is a continuation of International Application No. PCT/KR2022/002413 filed on Feb. 18, 2022, designating the United States, and claiming priority to Korean Patent Application No. 10-2021-0022651, filed Feb. 19, 2021, in the Korean Intellectual Property Office, the disclosures of all of which are hereby incorporated by reference herein in their entireties.

BACKGROUND

Field

Certain example embodiments relate to an electronic device for configuring a geofence and/or an operation method thereof.

Description of Related Art

A geofence indicates a virtual fence formed through location tracking technology. An electronic device may perform a designated service, according to whether the electronic device is located in the geofence.

SUMMARY

If an electronic device uniformly configures a geofence without considering a topographical factor or an environmental factor around the geofence, a malfunction or no operation may occur in determining in/out of the electronic device within the configured geofence. Accordingly, what is needed is a solution for the electronic device to adaptively configure the geofence based on the topographical factor or the environmental factor.

Certain example embodiments address a problem caused by uniformly configuring the geofence of conventional methods, and the electronic device may adaptively change the configuration of the geofence based on the topographical factor or the environmental factor and provide a stable geofence service a user, by adaptively changing the geofence configuration based on a location accuracy radius.

An electronic device according to various example embodiments may include a communication circuit and a processor electrically connected, directly or indirectly, to the communication circuit, where the processor may be configured to receive location information of the electronic device, identify whether an amount of the location information is greater than or equal to a reference amount, and change a geofence configuration based on a location accuracy radius of the location information, if the location information amount is equal to or greater than the reference amount, and the location accuracy radius may be determined based on a probability that the electronic device is actually located in a specific area.

A method according to an example embodiment may include receiving location information of the electronic device, identifying whether an amount of the location information is equal to or greater than a reference amount, and if the location information amount is equal to or greater than the reference amount, changing a geofence configuration based on a location accuracy radius of the location information, and the location accuracy radius may be determined based on a probability that the electronic device is actually located in a specific area.

In an apparatus and/or a method according to various example embodiments, an electronic device may adaptively change a configuration of a geofence in consideration of a topographical factor or an environmental factor, and thus prevent or reduce a malfunction, or no function, in determining in/out of the electronic device within the configured geofence. In addition, the apparatus and/or the method according to various example embodiments may allow the electronic device to perform a stable geofence service, by adaptively changing the geofence configuration.

Effects obtainable are not limited to the above-mentioned effects, and other effects which are not mentioned may be clearly understood by those skilled in the art of the present disclosure through the following descriptions.

BRIEF DESCRIPTION OF DRAWINGS

The above and other aspects, features and advantages of certain embodiments will be more apparent from the following detailed description, taken in conjunction with the accompanying drawings, in which:

FIG. 5A illustrates a location accuracy distribution graph, before processing according to an example embodiment.

DETAILED DESCRIPTION

Terms used in the present disclosure are used merely to describe specific embodiments, and may not intend to limit the scope of other embodiments. Singular expressions may include plural expressions unless the context clearly indicates otherwise. Terms used herein, including technical or scientific terms, may have the same meaning as those commonly understood by a person of ordinary skill in the technical field described in the present disclosure. Among the terms used in the present disclosure, terms defined in a general dictionary may be interpreted as having the same or similar meanings as those in the context of the related art, and unless explicitly defined in the present disclosure, may not be interpreted as ideal or excessively formal meanings. In some cases, even terms defined in the present disclosure may not be interpreted to exclude embodiments of the present disclosure.

A hardware-based approach will be described as an example in various example embodiments to be described hereafter. However, various example embodiments include technology which uses both hardware and software, and accordingly various example embodiments do not exclude a software-based approach.

Hereinafter, the present disclosure relates to an apparatus and a method for adaptively changing a geofence configuration of an electronic device in a wireless communication system. Specifically, the present disclosure describes a technique for configuring the geofence more appropriate for a real situation, by considering environmental factors around the electronic device in the wireless communication system.

Terms indicating location related variables (e.g., a distance, a length, a range, a radius), terms indicating network entities (e.g., an electronic device, an external electronic device), and so on used in the following description are illustrated for convenience of description. Accordingly, the present disclosure is not limited to the terms to be described, and other terms having the same technical meaning may be used. Also, in the present disclosure, to determine whether a specific condition is satisfied or fulfilled, expressions such as greater than or less than are used but is merely an expression by way of example and does not exclude expressions of equal to or greater than or equal to or less than. A condition expressed as 'greater than or equal to' may be replaced by 'greater than', a condition expressed as 'less than or equal to' may be replaced by 'less than', and a condition expressed as 'greater than or equal to and less than' may be replaced by 'greater than and less than or equal to'.

Hereinafter, various example embodiments are described with reference to the accompanying drawings. However, this is not intended to limit the present disclosure to a specific embodiment, and it should be understood that various modifications, equivalents, and/or alternatives of the embodiments of the present disclosure are included.

Figure 1:
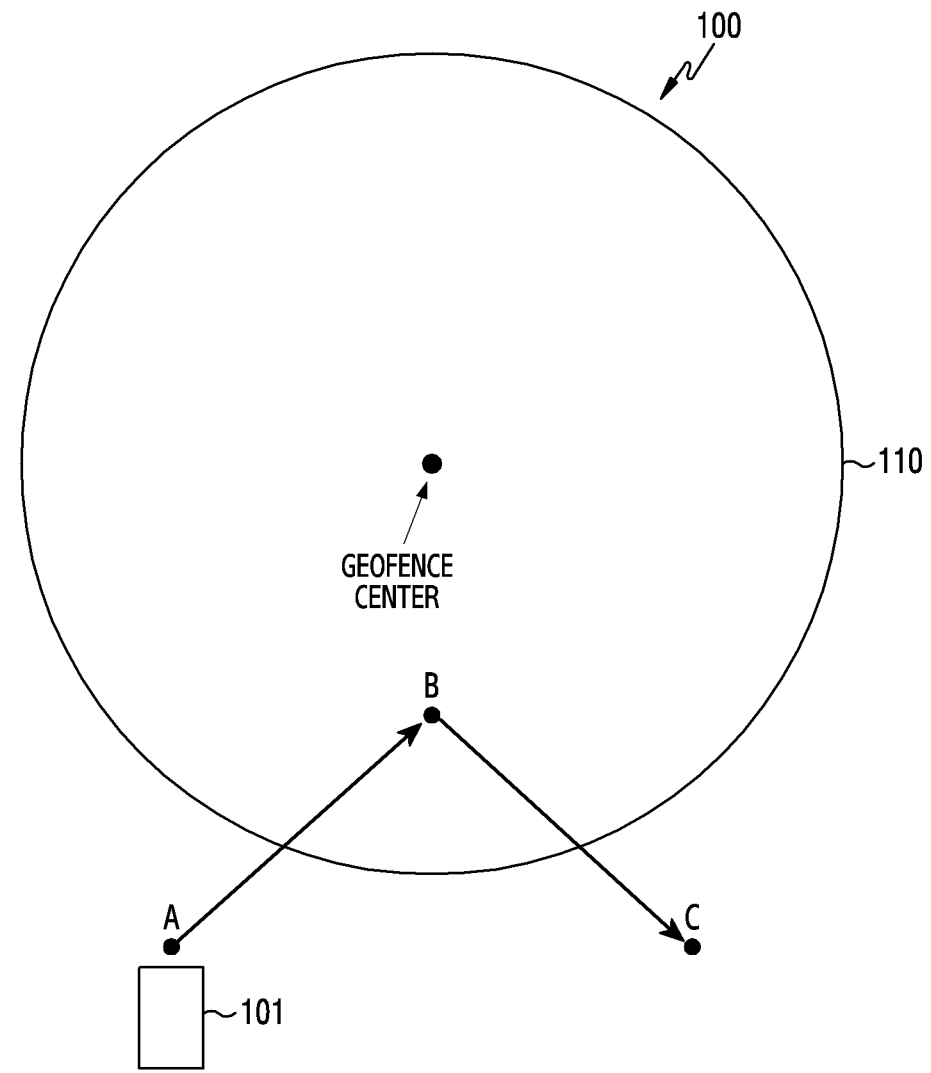
FIG. 1 illustrates an example of a geofence service according to an example embodiment.

FIG. 1 illustrates an example 100 of a geofence service according to an embodiment. An electronic device of FIG. 1 represents an electronic device 1401 of FIG. 14 hereafter.

Referring to FIG. 1, according to an embodiment, the electronic device may provide the geofence service to a user based on a location of the electronic device. According to an embodiment, the electronic device may configure a geofence according to a service property or the user. According to an embodiment, the electronic device may identify whether the electronic device has entered the configured geofence based on location information of the electronic device. The location information of the electronic device may include global navigation satellite system (GNSS) (e.g., global positioning system (GPS)) information, cellular positioning system (CPS) information or wi-fi positioning system (WPS) information. According to an embodiment, if identifying that the electronic device is located within the configured geofence, the electronic device may perform a preconfigured geofence service (e.g., a notification service). According to an embodiment, if identifying that the electronic device is located outside the configured geofence, the electronic device may stop the preset geofence service (e.g., a notification service).

Referring to FIG. 1, it may be assumed that the electronic device is receiving the geofence service, and the electronic device moves from "A" outside a currently configured geofence service area to a point "C" via a point "B".

According to an embodiment, the location information of the electronic device 101 may be received from a positioning system (a location provider). For example, the positioning system may include at least one of the GNSS (e.g., the GPS), the WPS, and the CPS. According to an embodiment, if the electronic device is located at the point "A" outside the geofence 110, the electronic device may identify that the electronic device is located outside the geofence 110 based on the received location information of the electronic device. According to an embodiment, if identifying that the electronic device is located outside the geofence 110, the electronic device may stop servicing based on the geofence 110.

According to an embodiment, if the electronic device moves from the point "A" outside the geofence 110 to the point "B" inside the geofence 110, the electronic device may identify that the electronic device enters the geofence 110 based on the received location information of the electronic device. According to an embodiment, if the electronic device identifies that the electronic device enters the geofence 110, the electronic device may perform the service based on the geofence 110 of the electronic device.

According to an embodiment, if the electronic device moves from the point "B" inside the geofence 110 to the point "C" outside the geofence 110, the electronic device may identify that the electronic device exits the geofence 110 based on the received location information of the electronic device. According to an embodiment, if identifying that the electronic device exits the geofence 110, the electronic device may stop the servicing based on the geofence 110.

If the electronic device uniformly configures the geofence range without considering a topographical factor or environmental factor, a malfunction or no operation may occur in determining whether the electronic device enters the geofence.

However, the electronic device according to example embodiments may adaptively configure the geofence according to the location or the surrounding environment of the electronic device. That is, the electronic device according to example embodiments may calculate a radius of location accuracy based on the topographical factor or the environmental factor. The electronic device may adaptively configure the geofence based on the location accuracy radius. For example, the electronic device may adaptively change the radius of the geofence based on the location accuracy radius. As another example, the electronic device may adaptively change a center of the geofence based on the location accuracy radius. Hence, by adaptively changing the geofence configuration, the electronic device may prevent or reduce likelihood of the malfunction or no operation in determining whether the electronic device enters the geofence, and perform a stable geofence service.

Figure 2:
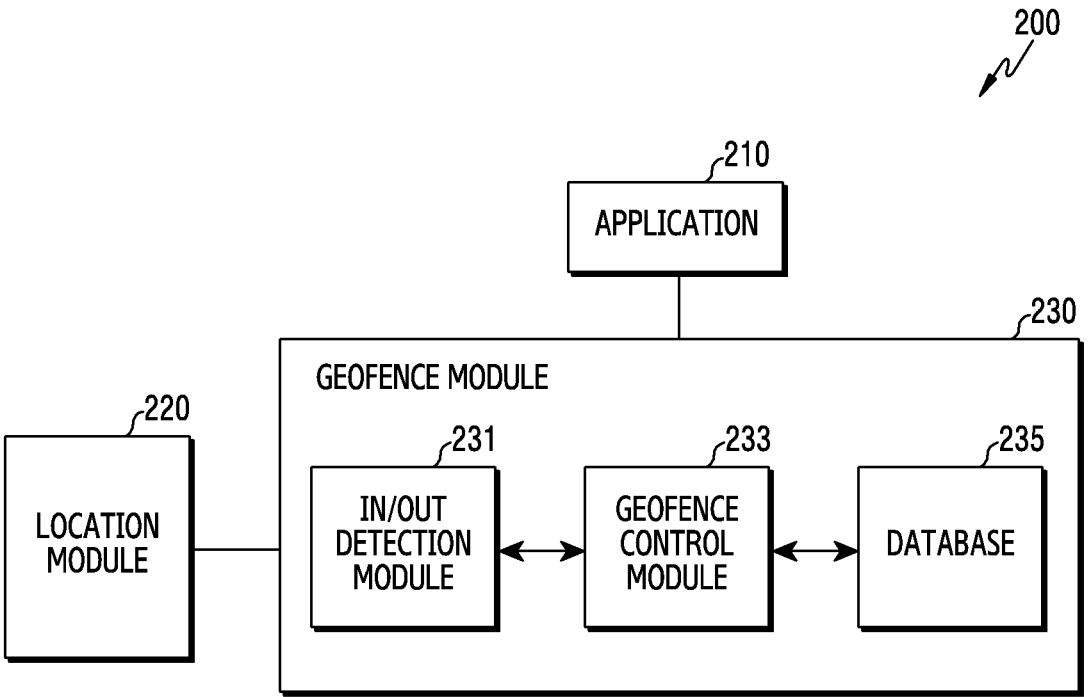
FIG. 2 illustrates a functional configuration of an electronic device according to an example embodiment.

FIG. 2 illustrates a functional configuration 200 of an electronic device according to an embodiment. The electronic device of FIG. 2 represents the electronic device 1401 of FIG. 14 hereafter. The electronic device may be a portable electronic device, and may be a device such as a portable terminal, a mobile phone, a mobile pad, a media player, a tablet computer, a handheld computer or a personal digital assistant (PDA). Also, it may be any portable electronic device including a device which combines functions of two or more of these devices.

Referring to FIG. 2, the electronic device may include an application 210, a location module 220, and a geofence module 230.

According to an embodiment, the application 210 may be configured to allow the electronic device to perform the geofence service, by detecting an in/out event of the electronic device with respect to a specific location. The specific location may be determined based on specific latitude and/or specific longitude. According to an embodiment, the application 210 may be configured to determine an area within a specific distance from the specific location as the geofence. For example, the application 210 may determine the geofence within a specific radius from the specific location.

According to an embodiment, the application 210 may transmit a geofence list including at least one geofence to the geofence module 230. According to an embodiment, the application 210 may receive from the geofence module 230 an entry notification of the electronic device for at least one geofence of the geofence list. According to an embodiment, the application 210 may receive an exit notification of the electronic device for at least one geofence of the geofence list from the geofence module 230. Although not depicted in the drawing, according to an embodiment, the application 210 may include a plurality of applications 210, and the electronic device may simultaneously perform a plurality of geofence services based on the plurality of the applications 210.

According to an embodiment, the location module 220 may be a module for managing location information of the electronic device. According to an embodiment, upon a request for the location information of the electronic device from the geofence module 230, the location module 220 may request the positioning system to measure the location of the electronic device. According to an embodiment, the location module 220 may receive the measured location information of the electronic device from the positioning system. According to an embodiment, the location module 220 may transmit the received location information of the electronic device to the geofence module 230. For example, the positioning system may include at least one of the GNSS (e.g., the GPS), the WPS, and the CPS.

According to an embodiment, the location module 220 may transmit the received location information of the electronic device to a module registered as a listener of the location information of the electronic device. For example, with the geofence module 230 registered as the listener at the location module 220, the location module 220 may request the location system to locate the electronic device. According to an embodiment, the location module 220 may receive the measured location information of the electronic device from the positioning system. According to an embodiment, the location module 220 may transmit the received location information of the electronic device to the geofence module 230 registered as the listener. For example, the positioning system may include at least one of the GNSS (e.g., the GPS), the WPS, and the CPS.

According to an embodiment, the geofence module 230 may determine whether the electronic device enters the geofence to stably provide the geofence service. According to an embodiment, the geofence module 230 may determine whether the electronic device exits the geofence to stably provide the geofence service.

According to an embodiment, the geofence module 230 may provide a geofence related application program interface (API) to the application 210. According to an embodiment, the geofence module 230 may transmit an event notification of the geofence of the electronic device to the application 210, based on the geofence list received from the application 210. The event notification of the geofence may include any one of a notification informing that the electronic device enters the geofence or a notification informing that the electronic device exits the geofence. The geofence module 230 may include an in/out detection module 231, a geofence control module 233, and/or a database 235.

According to an embodiment, the in/out detection module 231 may identify whether the electronic device enters the geofence, based on the location information of the electronic device received from the location module 220. In this case, the geofence may be determined with center coordinates of the geofence including latitude and longitude, and a specific distance (e.g., a radius) from the center coordinates of the geofence.

According to an embodiment, if the electronic device enters the geofence, the in/out detection module 231 may determine "in", based on the location information of the electronic device received from the location module 220. According to an embodiment, if determining that the electronic device is "in" the geofence, the in/out detection module 231 may transmit a notification to the application 210.

According to an embodiment, if the electronic device exits the geofence, the in/out detection module 231 may determine "out", based on the location information of the electronic device received from the location module 220. According to an embodiment, if determining that the electronic device is "out" of the geofence, the in/out detection module 231 may transmit a notification to the application 210.

According to an embodiment, the in/out detection module 231 may monitor geofences registered. According to an embodiment, if receiving information of the changed geofence from the geofence control module 233, the in/out detection module 231 may identify in/out of the electronic device for the geofence based on the received geofence information.

According to an embodiment, the geofence control module 233 may control the geofence range to stably provide the geofence service. The geofence control module 233 may create a virtual fence around the geofence. According to an embodiment, the geofence control module 233 may receive location information obtained inside the created virtual fence. According to an embodiment, the geofence control module 233 may transmit the received location information to the database 235. According to an embodiment, the geofence control module 233 may store the received location information in the database 235 in association with the geofence corresponding to the location information. According to an embodiment, the geofence control module 233 may change the configuration of the geofence based on the received location information of the electronic device. For example, the geofence control module 233 may change the configuration of the geofence, by changing the radius of the geofence. For example, the geofence control module 233 may change the geofence configuration, by changing the center of the geofence.

According to an embodiment, the geofence control module 233 may transmit the changed geofence information to the in/out detection module 231.

According to an embodiment, the database 235 may store the received location information of the electronic device. According to an embodiment, the database 235 may receive the location information received from the geofence control module 233. According to an embodiment, the location information may include at least one of the latitude, the longitude, the accuracy, a location timestamp, a location provider type, a geofence identifier (ID) or a combination thereof. According to an embodiment, the database 235 may store the received location information of the electronic device for each geofence. According to an embodiment, the database 235 may store the received location information of the electronic device in association with the geofence corresponding to the location.

According to an embodiment, according to a limited capacity of the database 235 or hardware performance change of the electronic device, the database 235 may delete location information which passes a specific time period among the stored electronic device location information. According to an embodiment, if the number of the stored location information is the maximum or high, the database 235 may delete old location information and then store new location information in a sliding window manner.

Figure 14:
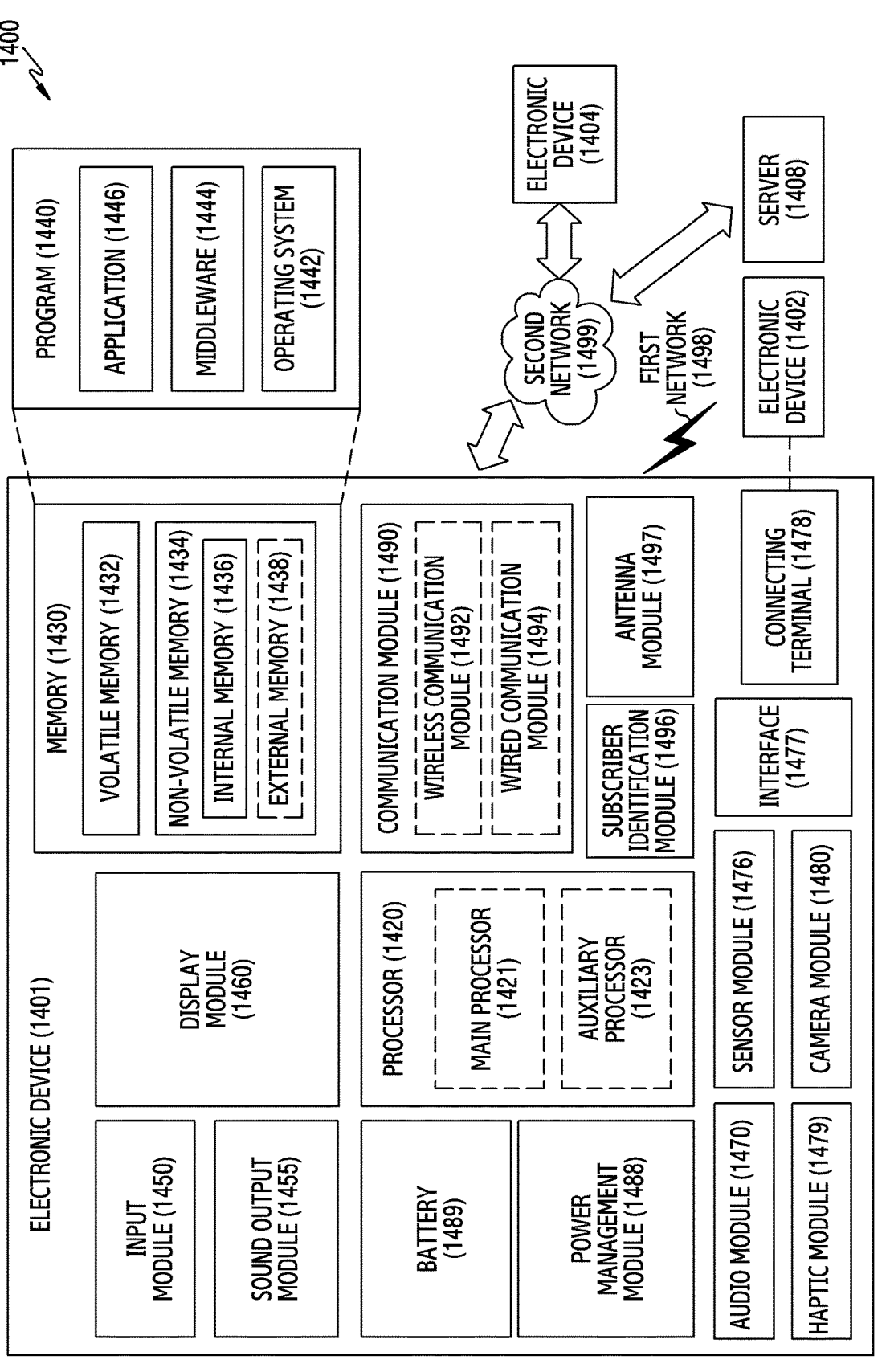
FIG. 14 is a block diagram of an electronic device in a network environment according to an example embodiment.

In the embodiment of FIG. 2, it may be understood that the functions performed by the location module 220, the geofence module 230 (e.g., the in/out detection module 231, the geofence control module 233, and the database 235) and/or the application 210 are performed by a processor 1420 by executing instructions stored in a memory 1430 to be described in FIG. 14. Also, in an embodiment, the electronic device may use one or more hardware processing circuits to perform various functions and operations disclosed in this document. In addition, the connection relationship between the hardware and/or the software shown in FIG. 2 is for convenience of description, and does not limit flows and/or a directions of the data or the instructions.

Figure 3:
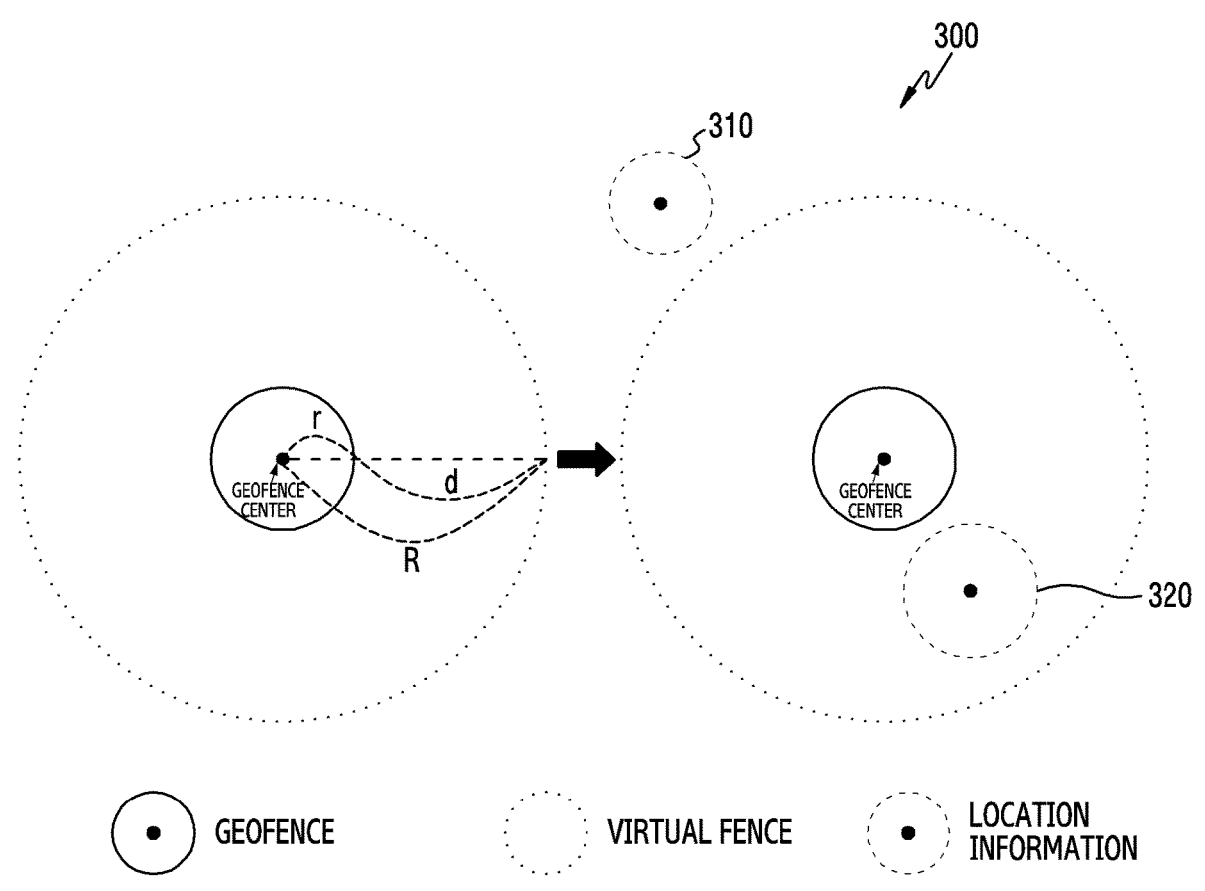
FIG. 3 illustrates an example of location information reception according to an example embodiment.

FIG. 3 illustrates an example 300 of receiving location information according to an embodiment. An electronic device of FIG. 3 represents the electronic device 1401 of FIG. 14 hereafter.

Referring to FIG. 3, the electronic device may configure a geofence according to a service property or user setting. For example, the electronic device may determine the geofence as an area separated from the center of the geofence by a specific radius r. According to an embodiment, the electronic device may determine a virtual fence based on the location center and the radius of the geofence. For example, the electronic device may determine the virtual fence as an area separated by a specific radius R from the geofence center. In this case, the radius R of the virtual fence is a value obtained by adding an additional radius d to the geofence radius r, and may indicate a radius for covering the entire geofence.

According to an embodiment, the electronic device may receive location information of the electronic device from the positioning system. The positioning system may include at least one of the GNSS (e.g., the GPS), the WPS, and the CPS. According to an embodiment, if the location of the electronic device is located inside the geofence, the electronic device may receive the location information of the electronic device.

According to an embodiment, if the electronic device location is located outside the geofence, the electronic device may receive the location information of the electronic device. For example, if the received current location information of the electronic device corresponds to a location 310, the electronic device may determine that the current location of the electronic device is outside the geofence, and may not receive the location information of the electronic device.

According to an embodiment, if the electronic device location is not located inside the geofence but is located inside the virtual fence, the electronic device may receive the location information of the electronic device. For example, if the received current location information of the electronic device corresponds to a location 320, the electronic device may determine that the current location of the electronic device is outside the geofence or inside the virtual fence, and may receive the received location information of the electronic device. According to an embodiment, the electronic device may store the received location information in a database in association with the geofence.

According to an embodiment, the electronic device may receive the location information of the electronic device, in response to registering the geofence in an application of the electronic device. According to an embodiment, the electronic device may stop receiving the location information of the electronic device, in response to releasing the geofence in the application of the electronic device. According to an embodiment, the electronic device may delete the location information stored in relation to the released geofence, in response to releasing the geofence in the application of the electronic device.

Figure 4:
FIG. 4 illustrates an example of location information according to an example embodiment.
Figure 4:
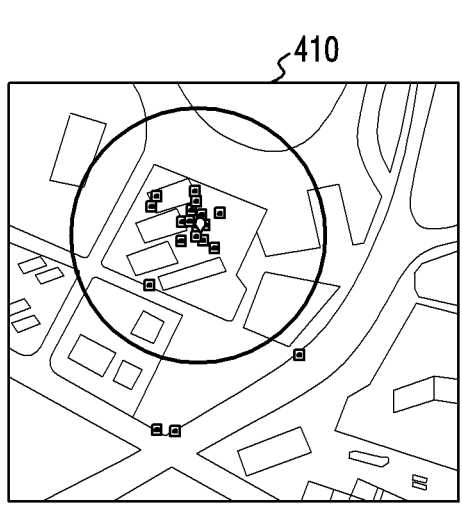

FIG. 4 illustrates an example 400 of location information according to an embodiment. An electronic device of FIG. 4 represents the electronic device 1401 of FIG. 14 hereafter.

Referring to FIG. 4, the location information may be received based on a geofence configured in a specific area, as shown in a map 410. According to an embodiment, the electronic device may receive the location information of the electronic device from the positioning system. As shown in a table 420 of location information elements, the received location information may include at least one of the latitude, the longitude, the accuracy, time of obtaining the location (timestamp), a location provider type, a geofence ID or a combination thereof.

Herein, the radius of the location accuracy may be determined based on a probability that the electronic device is actually located in the specific area. The location accuracy radius may indicate a radius in which, if a circle having the location accuracy radius is drawn from the location center, the probability that the electronic device location actually exists inside the circle is a designated value (e.g., 68 percent (%)). In this case, the location center indicates center coordinates of the location information as the electronic device location and may be expressed by the longitude and the latitude.

According to an embodiment, if the location information of the electronic device is received over a reference amount, the electronic device may analyze the location information. According to an embodiment, the electronic device may analyze a location accuracy distribution, based on the received location information. According to an embodiment, the electronic device may obtain at least one of a mean value, a standard deviation, and a median of the location accuracy radii through the analysis of the location accuracy distribution.

Figure 5A:
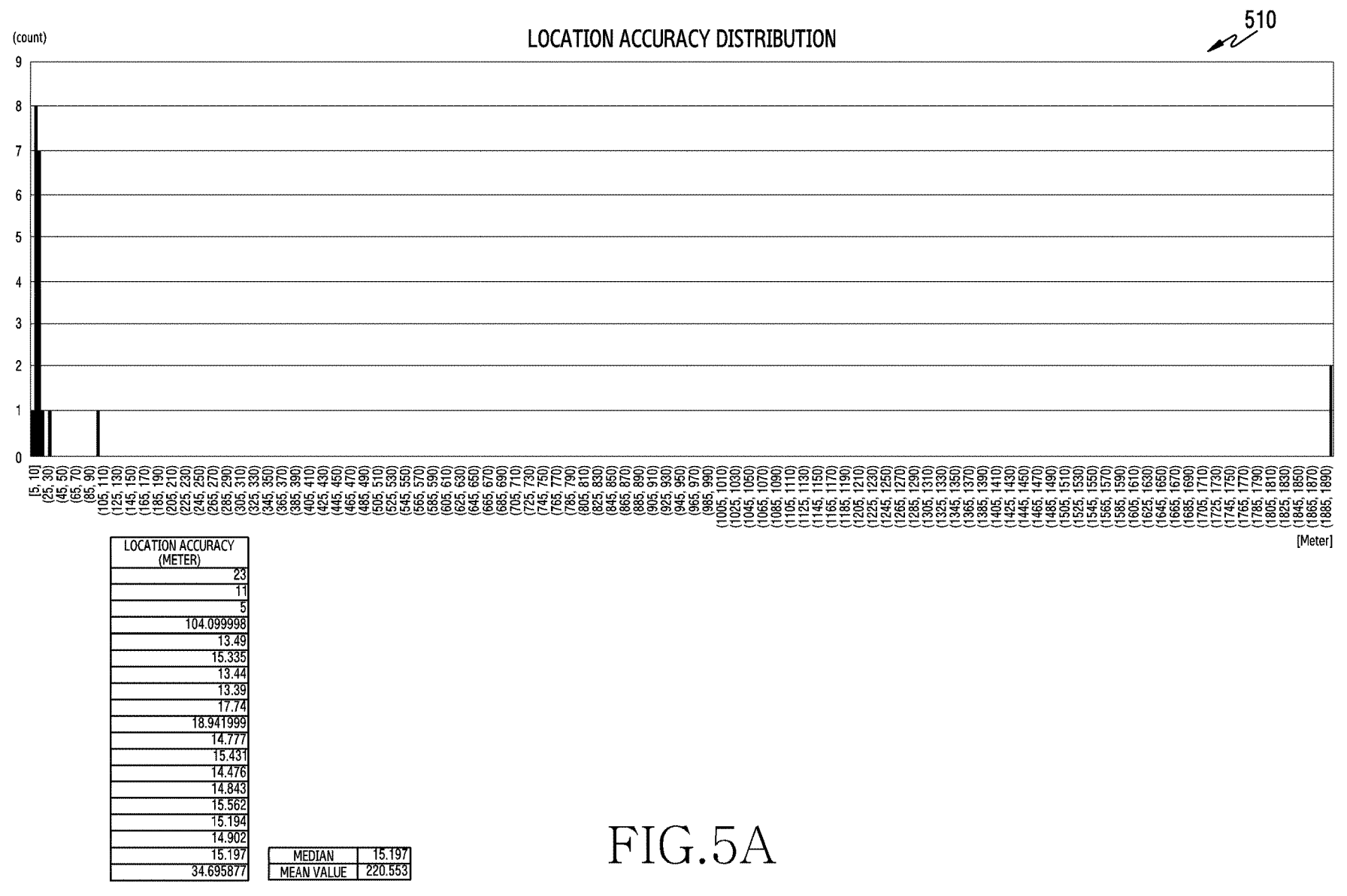

FIG. 5A illustrates a location accuracy distribution graph 510 before processing location information according to an embodiment. The location accuracy distribution may indicate a distribution of location accuracy radii of the received location information. As the electronic device changes the geofence configuration based on at least one of the mean value, the standard deviation, and the median of the location accuracy radii, it may be necessary to process the received location information, to reduce distortions of the mean value, the standard deviation, and the median of the location accuracy radii.

The electronic device of FIG. 5A represents the electronic device 1401 of FIG. 14 hereafter. A horizontal axis of the graph of FIG. 5A indicates the location accuracy radius (unit: meter (m)). A vertical axis of the graph of FIG. 5A indicates the number of location information corresponding to the location accuracy radius. If a circle is drawn such that the probability that the actual electronic device location lies within the circle is a designated value (e.g., 68%) based on the location information of the electronic device, the location accuracy radius may indicate the radius of the corresponding circle.

Referring to FIG. 5A, in the location accuracy distribution of 21 electronic device location information received in total, the median of the location accuracy radii is 15.197 meters, and the mean value of the location accuracy radii is 220.553 meters. At this time, the location accuracy radius values are distributed most in an interval greater than 10 meters and less than 20 meters in the location accuracy distribution graph. Hence, the calculated mean value (e.g., 220.553 meters) may not reflect the location accuracy distribution due to the mean value distortion. The electronic device may need to process the location information to acquire an accurate mean value of the location accuracy radii.

Figure 5B:
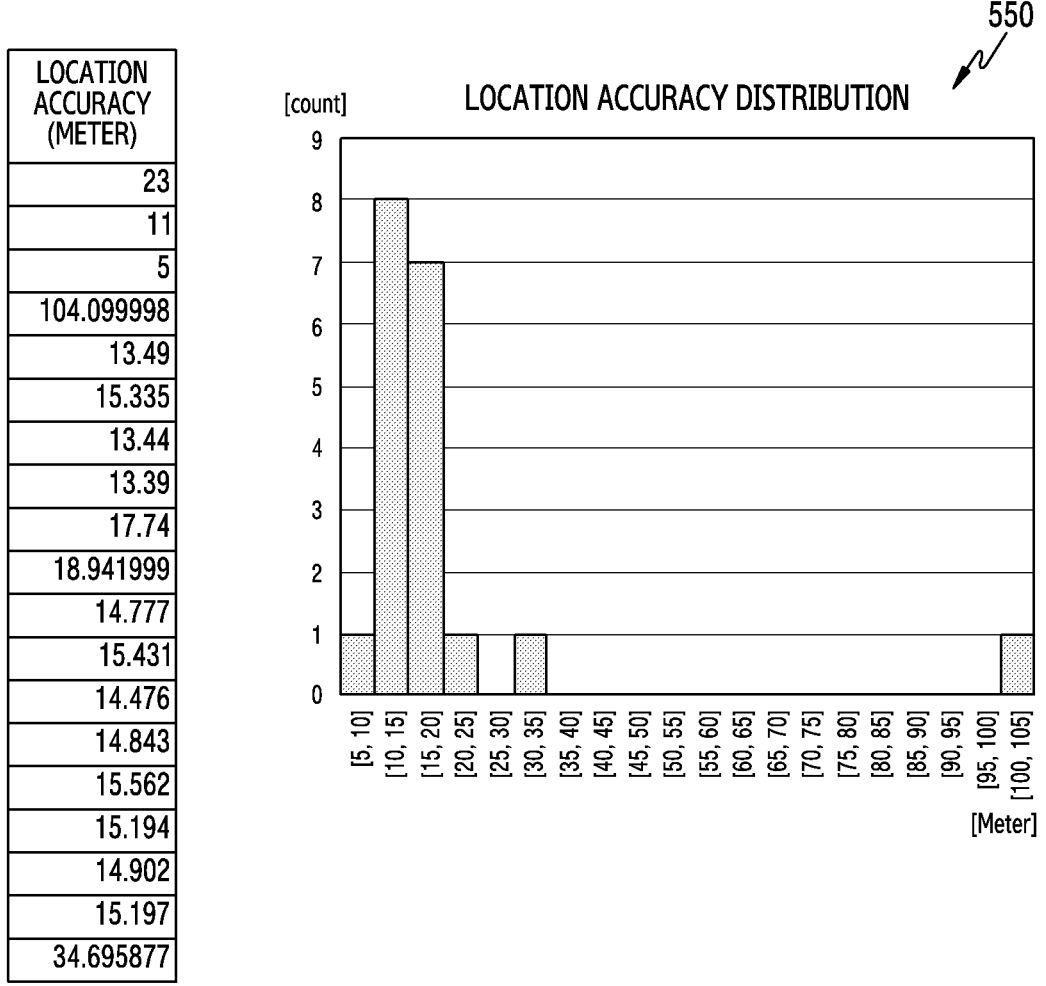
FIG. 5B illustrates a location accuracy distribution graph, after processing according to an example embodiment.

FIG. 5B illustrates a location accuracy distribution graph 550 after processing the location information according to an embodiment. The location accuracy distribution may indicate the distribution of the location accuracy radii of the received location information. According to an embodiment, to remove the mean value distortion, the electronic device may remove an outlier of the location accuracy radius from the location accuracy radii. The electronic device may process the received location information, by removing the outlier of the location accuracy radius. According to an embodiment, the electronic device may calculate the mean value of the location accuracy radii based on the remaining location information after the processing.

The electronic device of FIG. 5B represents the electronic device 1401 of FIG. 14 hereafter. The horizontal axis of the graph of FIG. 5B indicates the radius (unit: meter (m)) of the location accuracy. The vertical axis of the graph of FIG. 5B indicates the number of location information corresponding to the location accuracy radius. If a circle is drawn such that the probability that the actual electronic device location lies within the circle is a designated value (e.g., 68%) based on the location information of the electronic device, the location accuracy radius may indicate the radius of the corresponding circle.

Referring to FIG. 5B, the electronic device may remove information having the location accuracy radius which is the outliner among the location accuracy radius values and corresponds to a value greater than the virtual fence radius (e.g., information having the location accuracy radius of the interval exceeding 1885 meters and equal to or more than 1890 meters), as the processing on the location accuracy distribution. By calculating the mean value of the location accuracy radii based on the remaining location information after the processing, the electronic device may prevent or reduce the mean value distortion and obtain a mean value of the location accuracy radii similar to the actual location accuracy distribution. In the location accuracy distribution of 19 electronic device location information processed in total, the median of the location accuracy radii is 15.194 meters, and the mean value of the location accuracy radii is 20.5534 meters. Compared with before processing, it may be identified that the median does not differ but the mean value differs more than 10 times. In addition, the location accuracy radius values are distributed most in the interval exceeding 10 meters and less than 20 meters in the actual location accuracy distribution, and the electronic device may obtain the mean value similar to the actual location accuracy distribution, based on the processed location information.

According to an embodiment, the electronic device may determine a minimum or small radius of the geofence based on the obtained mean value of the location accuracy radii. According to an embodiment, the electronic device may change the geofence configuration with the determined minimum or small radius of the geofence. For example, if the obtained median of the of the location accuracy radii is 15.194 meters and the mean value of the location accuracy radii is 20.5534 meters, the electronic device may change the geofence radius to the geofence minimum radius 20.6 meters to receive a stable geofence service.

According to an embodiment, the electronic device may determine an optimal geofence radius based on the obtained mean value and median of the location accuracy radii. According to an embodiment, the electronic device may determine a value obtained by adding the mean value and the median of the location accuracy radii as the optimal geofence radius. According to an embodiment, the electronic device may change the geofence configuration with the determined optimal geofence radius. For example, if the obtained median of the location accuracy radii is 15.194 meters, and the mean value of the location accuracy radii is 20.5534 meters, the electronic device may change the geofence radius to the geofence optimal radius 35 meters to receive a stable geofence service.

Although not depicted in FIG. 5B, according to an embodiment, the electronic device may not change the configuration of the geofence, even if a reference value of the location accuracy radius is greater than the geofence radius. According to an embodiment, if all of the received location information of the electronic device is measured by the same location provider type, the electronic device may not change the configuration of the geofence although the reference value of the location accuracy radius is greater.

According to an embodiment, the electronic device may configure the geofence, based on the received location information. According to an embodiment, the electronic device may change the geofence configuration, based on the received location information.

According to an embodiment, prior to changing the configuration of the geofence, the electronic device may receive the location information of the electronic device equal to or greater than a reference amount. According to an embodiment, the electronic device may determine the electronic device location information equal to or greater than the reference amount based on a location information reception period. According to an embodiment, the electronic device may determine the electronic device location information equal to or greater than the reference amount based on the number of the received location information. According to an embodiment, the electronic device may learn the location information until it receives location information equal to or greater than the reference amount for the sake of the stable geofence service. According to an embodiment, if receiving location information received from an external electronic device or a server, the electronic device may change the configuration of the geofence without learning the location information. According to an embodiment, the electronic device may perform learning on the location information until the corresponding geofence is deleted. According to an embodiment, the electronic device may periodically receive the location information.

According to an embodiment, the electronic device may determine whether the geofence is appropriate at set time intervals. For example, the electronic device may determine whether the geofence is appropriate every time the location information is received. As another example, the electronic device may determine whether the geofence is appropriate every time the location information is received over the reference amount.

According to an embodiment, the electronic device may calculate the optimal geofence radius based on the location accuracy radius of the currently received location information. According to an embodiment, the electronic device may determine whether the geofence is appropriate, by comparing the calculated optimal geofence radius with the current geofence radius.

According to an embodiment, the electronic device may preferentially determine whether the geofence is appropriate with respect to a geofence which is close to the current location of the electronic device. According to an embodiment, the electronic device may determine whether the geofence is appropriate for all geofences registered in the electronic device. According to an embodiment, the electronic device may determine that the current geofence is appropriate if all location accuracy radius values except for the outlier are smaller than the size of the actual geofence radius.

According to an embodiment, if determining that the geofence is appropriate, the electronic device may maintain the geofence. According to an embodiment, if determining that the geofence is inappropriate, the electronic device may change the geofence to the calculated optimal geofence.

According to an embodiment, the electronic device may obtain information of the location accuracy radii from the location information of the electronic device. According to an embodiment, the electronic device may acquire at least one of the mean value, the standard deviation, and the median of the location accuracy radii. If a circle is drawn such that the probability that the actual electronic device location exists inside the circle is a designated value (e.g., 68%) based on the location information of the electronic device, the location accuracy radius may indicate the radius of the corresponding circle. The electronic device may process the received location information, to reduce distortions of the mean value, the standard deviation, and the median of the location accuracy radii. According to an embodiment, the electronic device may change the configuration of the geofence, based on at least one of the mean value, the standard deviation, and the median of the location accuracy radii.

Figure 6:
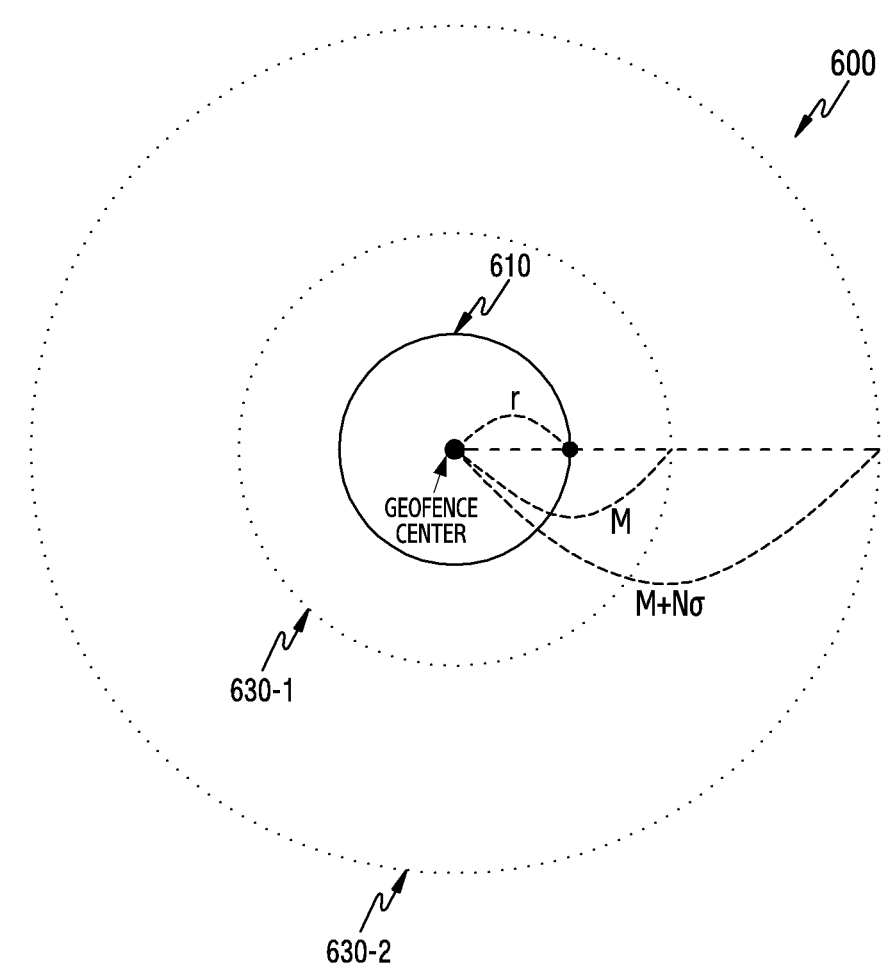
FIG. 6 illustrates an example of geofence configuration changing according to an example embodiment.

FIG. 6 illustrates an example 600 of geofence configuration changing according to an embodiment. FIG. 6 describes in detail operations of an electronic device for receiving the above-described location information and configuring a geofence area. The electronic device of FIG. 6 represents electronic device 1401 of FIG. 14 hereafter.

Referring to FIG. 6, according to an embodiment, the electronic device may determine whether a geofence 610 is appropriate based on at least one of a mean value M, a standard deviation σ or their combination of location accuracy radii. According to an embodiment, if a radius r of the geofence 610 exceeds the mean value M of the location accuracy radii, the electronic device may determine that the geofence 610 is appropriate.

According to an embodiment, if the electronic device determines that the geofence 610 is appropriate, the electronic device may maintain the geofence 610. According to an embodiment, if the electronic device determines that the geofence 610 is not appropriate, the electronic device may change the radius r of the geofence 610 to a first geofence area 630-1 or a second geofence area 630-2 having an optimal radius based on at least one of the mean value M, the standard deviation σ or their combination of the location accuracy radii. For example, the electronic device may determine a value obtained by adding the radius r of the geofence 610 and the mean value M of the location accuracy radii as the changed radius of the first geofence area 630-1. As another example, the electronic device may determine the radius r of the geofence 610 as the radius of the second geofence area 630-2 changed based on the mean value M and the standard deviation σ of the location accuracy radii.

FIG. 6 illustrates the embodiment in which the electronic device changes the radius geofence based on at least one of the mean value or the standard deviation of the location accuracy radii, but example embodiments are not limited thereto. According to an embodiment, the electronic device may determine a value obtained by adding the mean value M of the location accuracy radii and an integer multiple of the standard deviation Nσ to the radius r of the geofence 610 as the changed radius of the second geofence area 630-2. According to an embodiment, the electronic device may determine whether the geofence 610 is appropriate based on at least one of a median Q2 of the location accuracy radii, an interquartile range (IQR) value or a combination thereof. According to an embodiment, if the radius r of the geofence 610 exceeds the median Q2 of the location accuracy radii, the electronic device may determine that the geofence 610 is appropriate.

According to an embodiment, if the electronic device determines that the geofence 610 is not appropriate, the electronic device may change the radius r of the geofence 610 to a geofence having an optimal radius based on at least one of a location accuracy radius corresponding to a specific quantile point (e.g., Q3) among the location accuracy radii, the IQR value or a combination thereof. According to an embodiment, the electronic device may arrange the location accuracy radii in ascending order based on their size. According to an embodiment, the electronic device may divide the arranged location accuracy radii into four regions. In this case, the IQR value may indicate a value obtained by subtracting a value of a first quantile point Q1 from a location accuracy radius value corresponding to a third quantile point Q3. In this case, a location accuracy radius value corresponding to the first quantile point Q1 may indicate a location accuracy radius corresponding to upper 25% among the received location accuracy radii. In this case, a location accuracy radius value corresponding to a second quantile point Q2 may indicate a location accuracy radius value corresponding to upper 50% among all the location accuracy radii received. In this case, the location accuracy radius value corresponding to the third quantile point Q3 may indicate a location accuracy radius corresponding to upper 75% among all the location accuracy radii received. In this case, a location accuracy radius corresponding to a fourth quantile point Q4 may indicate a location accuracy radius corresponding to the top 100% among all the location accuracy radii received.

For example, the electronic device may determine a value obtained by adding the location accuracy radius corresponding to a specific quantile point (e.g., Q3) among the location accuracy radii to the radius r of the geofence 610 as the changed geofence radius. As another example, the electronic device may determine a value obtained by adding a location accuracy radius corresponding to a specific quantile point (e.g., Q3) and the IQR value to the radius r of the geofence 610 to as the changed geofence radius. As yet another example, the electronic device may determine a value obtained by adding a location accuracy radius corresponding to a specific quantile point (e.g., Q3) and the integer multiple of the IQR value to the radius r of the geofence 610 to as the changed geofence radius.

Figure 7:
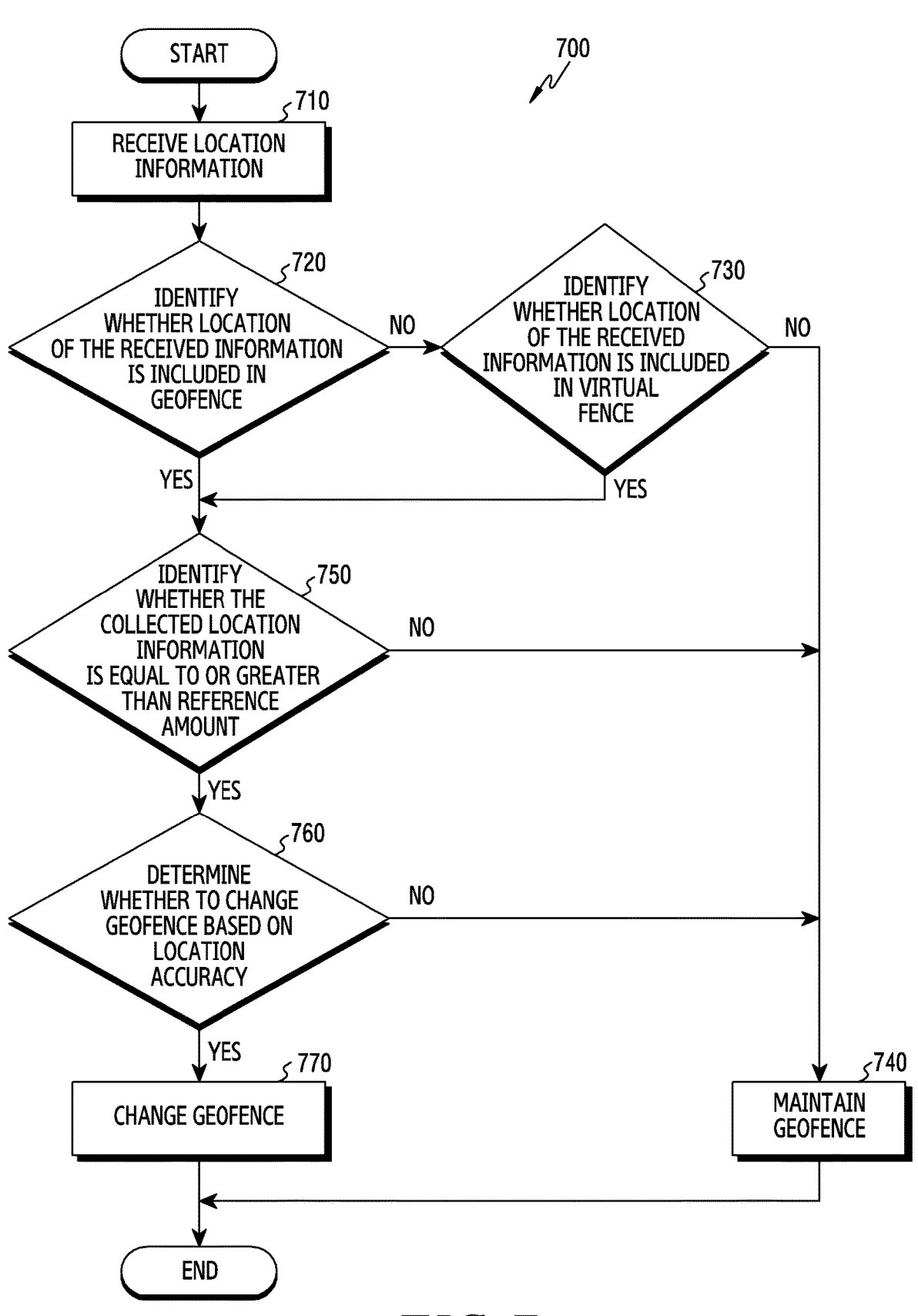
FIG. 7 illustrates an operation flow for changing a geofence configuration according to an example embodiment.

FIG. 7 illustrates a flow 700 of operations for changing a geofence configuration according to an embodiment. An electronic device of FIG. 7 represents the electronic device 1401 of FIG. 14 hereafter. By changing the geofence configuration based on location information equal to or greater than a reference amount, the electronic device may change the configuration of the geofence in consideration of a topographical factor or an environmental factor around the geofence.

Referring to FIG. 7, according to an embodiment, the electronic device may receive location information in operation 710. According to an embodiment, the electronic device may receive electronic device location information from the positioning system. According to an embodiment, the electronic device location information may include at least one of GNSS (e.g., GPS) information, CPS information or the WPS information.

According to an embodiment, the electronic device may identify whether a location of the received information is included in the geofence in operation 720. According to an embodiment, the electronic device may identify whether the electronic device location lies within the geofence. According to an embodiment, the electronic device may identify whether the electronic device location is included in the geofence, based on longitude and latitude information included in the received location information. According to an embodiment, if the electronic device location is inside the geofence, the electronic device may perform operation 750. According to an embodiment, if the electronic device location is outside the geofence and is not included in the geofence, the electronic device may perform operation 730.

According to an embodiment, the electronic device may identify whether the location of the received information is included in a virtual fence in operation 730. According to an embodiment, the electronic device may identify whether the electronic device location is included in the virtual fence, based on the longitude and latitude information included in the received location information. According to an embodiment, the electronic device may identify whether the electronic device location is inside the virtual fence. According to an embodiment, if the electronic device location is inside the virtual fence, the electronic device may perform operation 750. According to an embodiment, if the electronic device location is outside the virtual fence and is not included in the virtual fence, the electronic device may perform operation 740.

According to an embodiment, the electronic device may configure a virtual fence around the geofence. According to an embodiment, the electronic device may set a radius of the virtual fence to a value obtained by adding an additional radius to the geofence radius, to cover the whole geofence. According to an embodiment, the electronic device may receive location information obtained within the generated virtual fence.

According to an embodiment, the electronic device may maintain the geofence in operation 740. According to an embodiment, if the electronic device location is outside the geofence and is not included in the geofence, the electronic device may maintain the geofence. According to an embodiment, if the electronic device location is outside the virtual fence and is not included in the virtual fence, the electronic device may maintain the geofence. According to an embodiment, if the electronic device location is not included in the geofence and is not included in the virtual fence, the electronic device may maintain the geofence. According to an embodiment, if the received location information falls below the reference amount, the electronic device may not store the received location information, to be described. According to an embodiment, the electronic device may maintain the geofence, if the received location information falls below the reference amount to be described.

According to an embodiment, the electronic device may identify whether the received location information is equal to or greater than the reference amount in operation 750. The electronic device may need to receive the location information over the reference amount to secure reliability of the received location information. According to an embodiment, the electronic device may receive the electronic device location information equal to or greater than the reference amount to change the configuration of the geofence. According to an embodiment, if the received location information is equal to or greater than the reference amount, the electronic device may perform operation 760. According to an embodiment, if the received location information falls below the reference amount, the electronic device may perform operation 740.

According to an embodiment, the electronic device may identify whether the received location information is equal to or greater than the reference amount based on a location information reception period. For example, if receiving the electronic device location information over 24 hours or so, the electronic device may identify that the received location information is equal to or greater than the reference amount.

According to an embodiment, the electronic device may identify whether the received location information is equal to or greater than the reference amount based on the number of the received location information. For example, if receiving location information of about 200 electronic device or so, the electronic device may identify that the received location information is equal to or greater than the reference amount. According to an embodiment, the electronic device may learn the location information until it receives location information equal to or greater than the reference amount for the sake of the stable geofence service.

According to an embodiment, the electronic device may determine whether to change the geofence based on the location accuracy in operation 760. According to an embodiment, if the received location information is equal to or greater than the reference amount, the electronic device may determine whether to change the configuration of the geofence based on the location accuracy. According to an embodiment, the electronic device may determine whether the geofence having the current radius r corresponds to the geofence having the optimal radius based on the location accuracy. According to an embodiment, if the geofence having the current radius r corresponds to the geofence having the optimal radius based on the location accuracy, the electronic device may perform operation 740. According to an embodiment, if the geofence having the current radius r does not correspond to the geofence having the optimal radius based on the location accuracy, the electronic device may perform operation 770.

According to an embodiment, the electronic device may change the geofence based on the location accuracy radius in operation 770. According to an embodiment, if the geofence having the current radius r does not correspond to the geofence having the optimal radius based on the location accuracy, the electronic device may change the geofence based on the location accuracy radius. According to an embodiment, the electronic device may change the configuration of the geofence based on the location accuracy radius. According to an embodiment, if the received location information is equal to or greater than the reference amount, the electronic device may change the geofence configuration based on the location accuracy radius.

According to an embodiment, the electronic device may change from the geofence to the optimal geofence based on the location accuracy radius. According to an embodiment, the electronic device may change the geofence to the geofence having the optimal radius based on at least one of the mean value M, the standard deviation σ, or their combination of the location accuracy radii.

According to an embodiment, the electronic device may determine a value obtained by adding the mean value M of the location accuracy radii to the geofence radius as the changed geofence radius. As another example, the electronic device may determine a value obtained by adding the mean value M and the standard deviation σ of the location accuracy radii to the geofence radius as the changed geofence radius. According to an embodiment, the electronic device may determine a value obtained by adding the mean value M of the location accuracy radii and the integer multiple of the standard deviation σ to the geofence radius as the changed geofence radius.

According to an embodiment, the electronic device may change the geofence to the geofence with the optimal radius based on at least one of a location accuracy radius corresponding to a specific quantile point (e.g., Q3) among the location accuracy radii, an IQR value or a combination thereof. According to an embodiment, the electronic device may arrange the location accuracy radii in ascending order based on the size. According to an embodiment, the electronic device may divide the arranged location accuracy radii into four regions. In this case, the IQR value may indicate a value obtained by subtracting a value of a first quantile point Q1 from a location accuracy radius value corresponding to a third quantile point Q3. In this case, a location accuracy radius value corresponding to the first quantile point Q1 may indicate a location accuracy radius corresponding to upper 25% among the received location accuracy radii. In this case, a location accuracy radius value corresponding to a second quantile point Q2 may indicate a location accuracy radius value corresponding to upper 50% among all the location accuracy radii received. In this case, the location accuracy radius corresponding to the third quantile point Q3 may indicate a location accuracy radius corresponding to upper 75% among all the location accuracy radii received. In this case, a location accuracy radius corresponding to a fourth quantile point Q4 may indicate a location accuracy radius corresponding to the top 100% among all the location accuracy radii received.

According to an embodiment, the electronic device may determine a value obtained by adding the location accuracy radius corresponding to a specific quantile point (e.g., Q3) among the location accuracy radii to the geofence radius as the changed geofence radius. According to an embodiment, the electronic device may determine a value obtained by adding a location accuracy radius corresponding to a specific quantile point (e.g., Q3) and the IQR value to the geofence radius as the changed geofence radius. According to an embodiment, the electronic device may determine a value obtained by adding a location accuracy radius corresponding to a specific quantile point (e.g., Q3) and the integer multiple of the IQR to the geofence radius as the changed geofence radius.

Although not depicted, according to an embodiment, the electronic device may store the received location information in a server device or an external electronic device. According to an embodiment, the electronic device may classify and store the received location information based on the area. According to an embodiment, the electronic device may classify and store the received location information based on electronic device performance (e.g., whether a long term evolution (LTE) communication technology or a new radio (NR) communication technology is supported, whether GNSS (e.g., GPS) performance or CPS performance is supported). According to an embodiment, the electronic device may generate map information related to the location accuracy radius based on the classified location information. According to an embodiment, the electronic device may transmit the generated map information related to the location accuracy radius to the server device or an external electronic device. According to an embodiment, the electronic device may receive map information generated by another electronic device from a server device or an external electronic device. According to an embodiment, the electronic device may change the geofence configuration based on the received location accuracy radius map.

Figure 8:
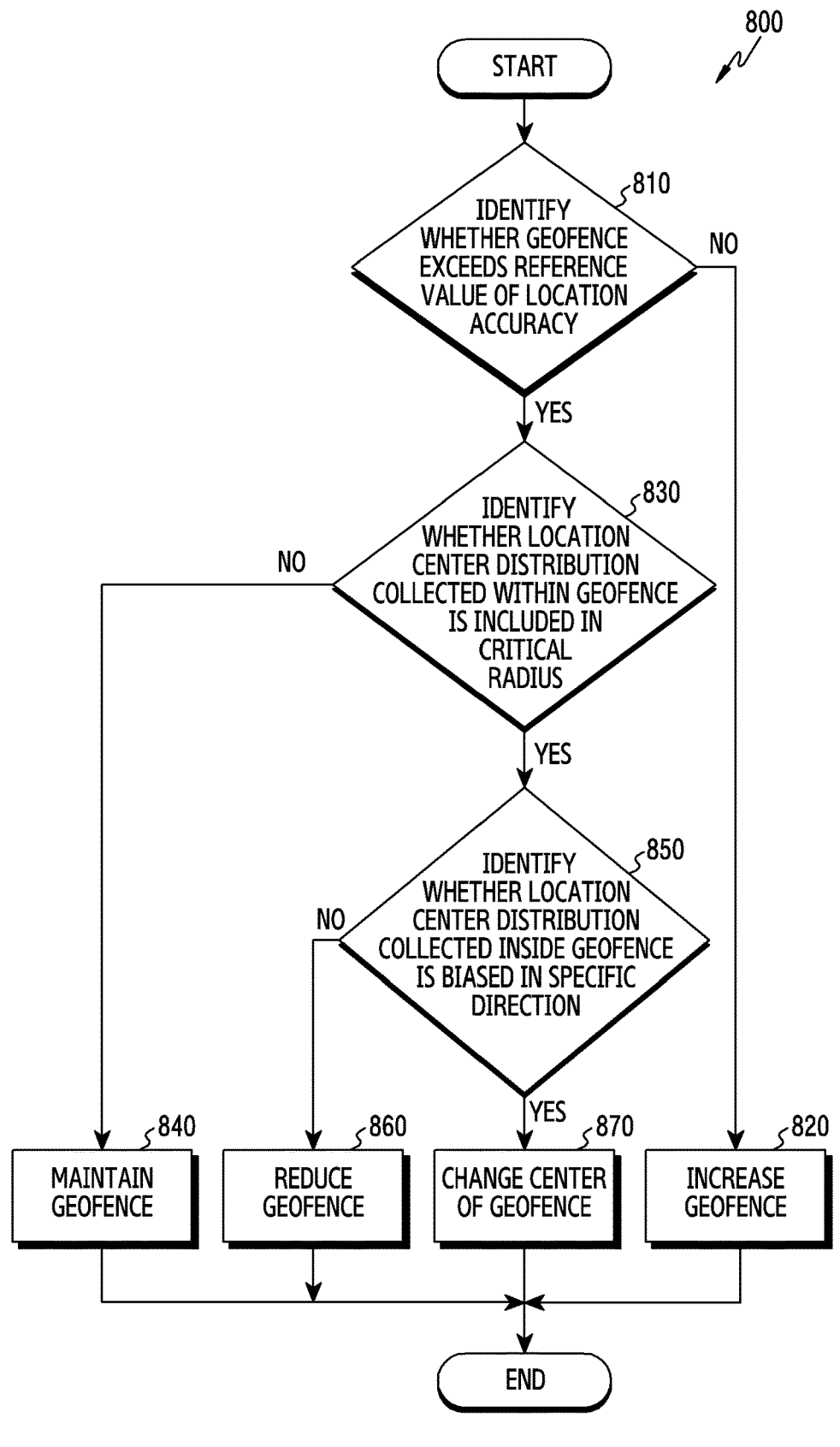
FIG. 8 illustrates an operation flow for changing a geofence configuration based on location information according to an example embodiment.

FIG. 8 illustrates an operation flow 800 for changing a geofence configuration based on location information according to an embodiment. An electronic device of FIG. 8 represents the electronic device 1401 of FIG. 14 hereafter. The electronic device may efficiently perform a geofence service by preventing or reducing unnecessary geofence event occurrence, by changing the geofence configuration based on a location accuracy radius or a location center distribution.

Referring to FIG. 8, according to an embodiment, the electronic device may identify whether the geofence exceeds a reference value for the location accuracy radius in operation 810. According to an embodiment, the electronic device may identify whether the geofence radius exceeds the reference value of the location accuracy radius. According to an embodiment, if the geofence radius exceeds the reference value of the location accuracy radius, the electronic device may perform operation 830. According to an embodiment, if the geofence radius falls below the reference value of the location accuracy radius, the electronic device may perform operation 820.

According to an embodiment, the electronic device may increase the geofence in operation 820. In an embodiment, increasing the geofence may be understood as increasing the geofence radius.

According to an embodiment, the electronic device may increase the geofence, based on a comparison result of the geofence radius and the mean value of the location accuracy radius. According to an embodiment, if the geofence radius falls below the mean value of the location accuracy radius, the electronic device may increase the geofence. According to an embodiment, if the geofence radius falls below the median of the location accuracy radius, the electronic device may increase the geofence.

According to an embodiment, the electronic device may increase the geofence radius based on at least one of the mean value, the standard deviation or their combination of the location accuracy radii.

According to an embodiment, the electronic device may increase the geofence radius based on at least one of a location accuracy radius corresponding to a specific quantile point (e.g., Q3) of the location accuracy radii, the IQR value or a combination thereof. Increasing the geofence at the electronic device shall be described later in FIG. 9.

According to an embodiment, the electronic device may identify whether a location center distribution collected within the geofence is included in a critical radius (or, specific radius) in operation 830. According to an embodiment, if the location center distribution collected within the geofence is included in the critical radius, the electronic device may perform operation 850. According to an embodiment, if the location center distribution collected within the geofence is not included in the critical radius, the electronic device may perform operation 840.

According to an embodiment, the electronic device may maintain the geofence in operation 840. In an embodiment, maintaining the geofence may substantially indicate maintaining the geofence radius.

According to an embodiment, the electronic device may maintain the geofence, based on a comparison result of the geofence radius and the mean value of the location accuracy radius. According to an embodiment, while the geofence radius exceeds the mean value of the location accuracy radius, if the location center distribution collected within the geofence is not included in the critical radius, the electronic device may maintain the geofence. According to an embodiment, while the geofence radius exceeds the median of the location accuracy radius, if the location center distribution collected inside the geofence is not included in the critical radius, the electronic device may maintain the geofence.

According to an embodiment, the electronic device may identify whether the location center distribution collected inside the geofence is biased in a specific direction in operation 850. According to an embodiment, if the location center distribution collected inside the geofence is biased in the specific direction, the electronic device performs operation 870. According to an embodiment, if the location center distribution collected inside the geofence is not biased in the specific direction, the electronic device performs operation 860.

According to an embodiment, the electronic device may reduce the geofence in operation 860. In an embodiment, reducing the geofence may substantially indicate reducing the geofence radius.

According to an embodiment, while the geofence radius exceeds the mean value of the location accuracy radius, if the location center distribution collected inside the geofence included in the critical radius of the geofence is not biased in the specific direction, the device may reduce the geofence. According to an embodiment, the electronic device may reduce the geofence radius to a size smaller than or equal to the critical radius. Reducing the geofence at the electronic device shall be described in FIG. 10.

According to an embodiment, the electronic device may change the center of the geofence in operation 870. According to an embodiment, while the geofence radius exceeds the mean value of the location accuracy radius, if the location centers distribution collected inside the geofence included in the critical radius of the geofence is biased in the specific direction, the electronic device may change the center of the geofence. According to an embodiment, the electronic device may change the center of the geofence to the biased specific direction. According to an embodiment, the electronic device may determine the changed geofence center, by moving the center of the geofence in the biased specific direction. According to an embodiment, the electronic device may adaptively change the configuration of the geofence based on machine learning. Changing the center of the geofence at the electronic device shall be described in FIG. 11.

Figure 9:
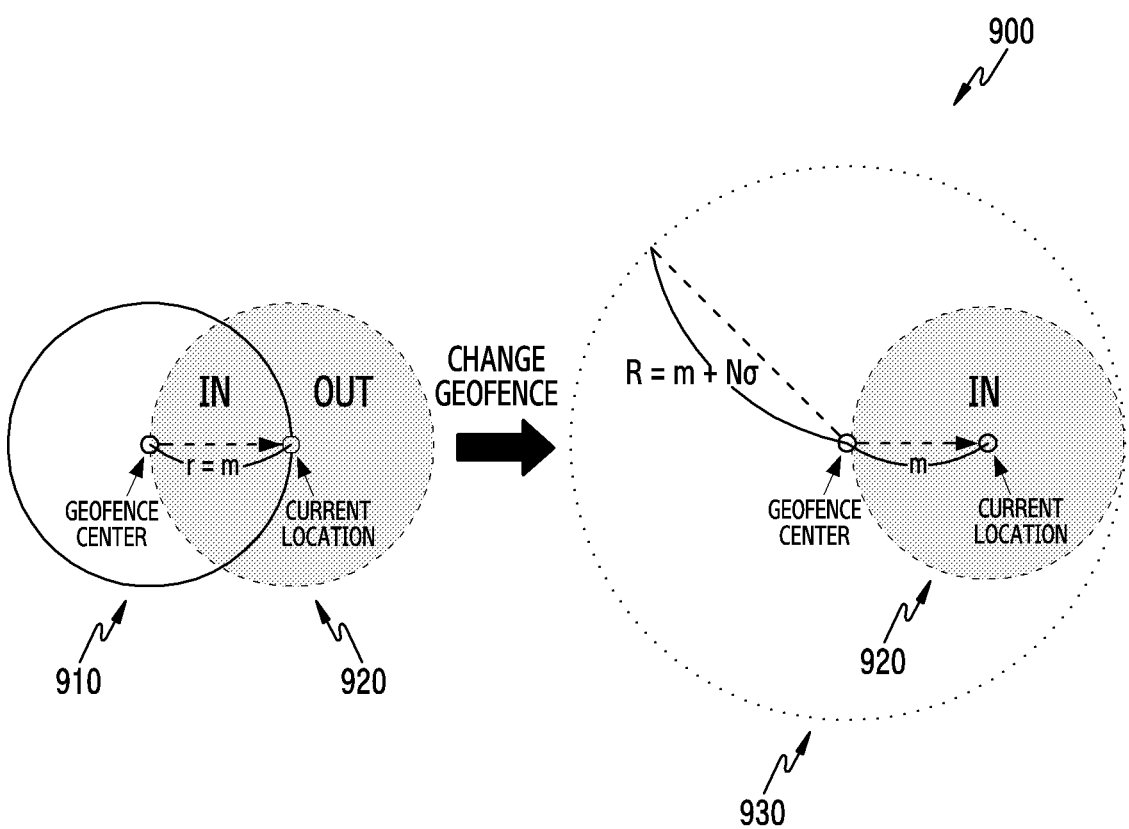
FIG. 9 illustrates an example of a geofence radius increasing operation based on location information according to an example embodiment.

FIG. 9 illustrates an example 900 of operations for increasing a geofence radius based on location information according to an embodiment. An electronic device of FIG. 9 represents the electronic device 1401 of FIG. 14 hereafter.

Referring to FIG. 9, it is assumed that the electronic device receives a geofence service, and a location accuracy radius m is the same in size as a radius r of a current geofence 910 at a current location of the electronic device. In addition, a ratio of a portion overlapping with the current geofence 910 in the location accuracy radius m may be calculated as about 39%. Hereinafter, an embodiment in which the electronic device increases the geofence based on electronic device location information will be described based on the aforementioned assumption.

According to an embodiment, since the ratio of the portion overlapping with the current geofence 910 and an area 920 having the location accuracy radius m at the current location (currently measured location) of the electronic device is about 39%, a probability that the actual location of the electronic device is inside the current geofence 910 (IN) is about 39%. Since a probability that the actual location of the electronic device is not inside the current geofence 910 (OUT) is higher with about 61%, the electronic device may not stably perform the geofence service. Hence, the electronic device according to the present disclosure may stably perform the geofence service, by increasing the radius r of the geofence 910 through a method to be described.

The electronic device may increase the radius r of the current geofence 910. According to an embodiment, if the radius r of the current geofence 910 is smaller than the location accuracy radius m, the electronic device may change the radius r of the current geofence 910, by increasing the radius r of the current geofence 910.

According to an embodiment, the electronic device may determine a value obtained by adding the mean value and the standard deviation of the location accuracy radii to the radius r of the current geofence 910 as a radius R of the changed geofence 930.

FIG. 9 illustrates the example of changing the configuration of the geofence based on the mean value and the standard deviation of the location accuracy radii, but example embodiments are not limited thereto. According to an embodiment, the electronic device may determine a value obtained by adding the mean value of the location accuracy radii to the geofence radius as the radius R of the changed geofence 930. Also, according to an embodiment, the electronic device may determine a value obtained by adding the mean value of the location accuracy radii and an integer multiple of the standard deviation to the geofence radius as the radius R of the changed geofence 930. Also, according to an embodiment, the electronic device 910 may increase the radius r of the current geofence 910 based on at least one of a location accuracy radius corresponding to a specific quantile point (e.g., Q3) among the location accuracy radii, the IQR value or a combination thereof. According to an embodiment, the electronic device may arrange the location accuracy radii in ascending order based on the size. According to an embodiment, the electronic device may divide the arranged location accuracy radii into four regions. In this case, the IQR value may indicate the value obtained by subtracting the value of the first quantile point Q1 from the location accuracy radius value corresponding to the third quantile point Q3. In this case, the location accuracy radius value corresponding to the first quantile point Q1 may indicate the location accuracy radius corresponding to upper 25% among the received location accuracy radii. In this case, the location accuracy radius value corresponding to the second quantile point Q2 may indicate the location accuracy radius value corresponding to upper 50% among all the location accuracy radii received. In this case, the location accuracy radius value corresponding to the third quantile point Q3 may indicate the location accuracy radius corresponding to upper 75% among all the location accuracy radii received. In this case, the location accuracy radius corresponding to the fourth quantile point Q4 may indicate the location accuracy radius corresponding to the top 100% among all the location accuracy radii received. According to an embodiment, the electronic device may determine a value obtained by adding the location accuracy radius corresponding to a specific quantile point (e.g., Q3) among the location accuracy radii to the geofence radius as the radius R of the changed geofence 930. According to an embodiment, the electronic device may determine a value obtained by adding a location accuracy radius corresponding to a specific quantile point (e.g., Q3) and the IQR value to the geofence radius as the radius R of the changed geofence 930. According to an embodiment, the electronic device may determine a value obtained by adding a location accuracy radius corresponding to a specific quantile point (e.g., Q3) and the integer multiple of the IQR value to the geofence radius as the radius R of the changed geofence 930.

Figure 10:
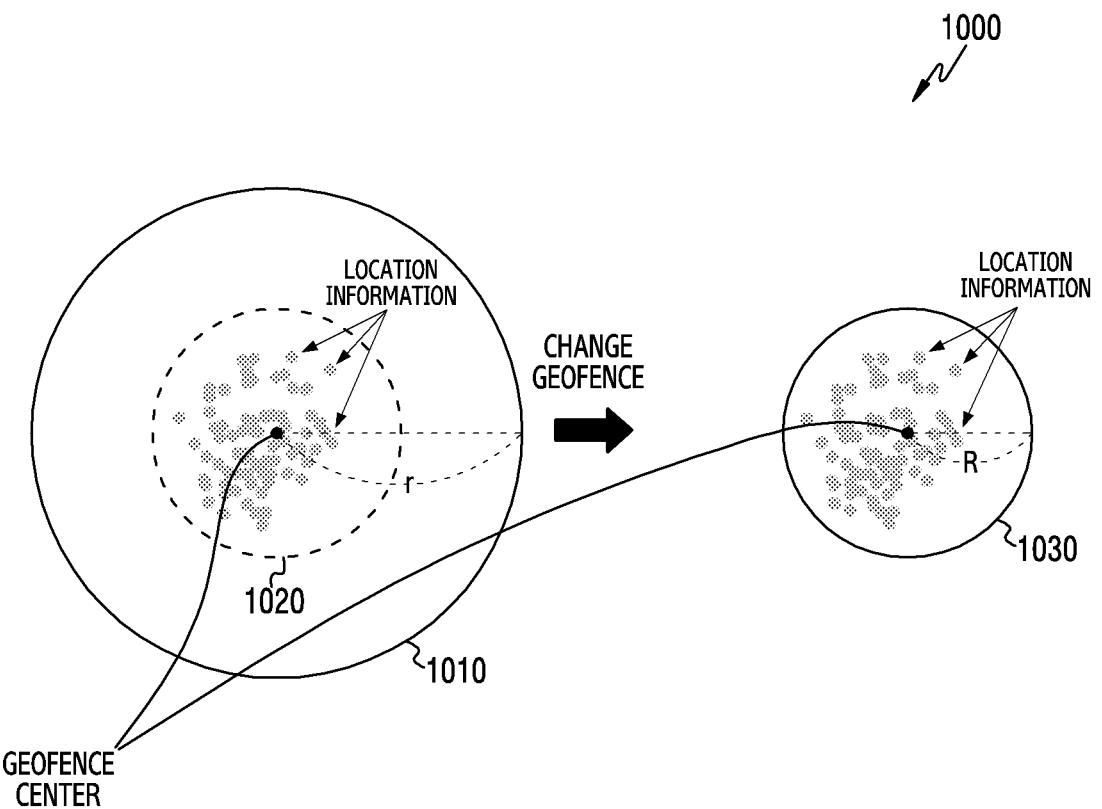
FIG. 10 illustrates an example of a geofence radius decreasing operation based on location information according to an example embodiment.

FIG. 10 illustrates an example 1000 of an operation for reducing a geofence radius based on location information according to an embodiment. An electronic device of FIG. 10 represents the electronic device 1401 of FIG. 14 hereafter.

Referring to FIG. 10, the electronic device may reduce the geofence based on location information. According to an embodiment, if the location center distribution of the received location information is concentrated at the center of the geofence, the electronic device may reduce the size of the geofence. According to an embodiment, the location center distribution may include a location center distribution collected within the geofence. According to an embodiment, while the radius of the geofence exceeds the mean value of the location accuracy radii, if the location center distribution included in a critical radius 1020 of the geofence is not biased in a specific direction, the electronic device may decrease a radius r of a geofence 1010. According to an embodiment, the electronic device may reduce the radius r of the current geofence 1010 to be smaller than or equal to the critical radius 1020. According to an embodiment, the electronic device may determine the critical radius 1020 as a radius for entirely covering the location center distribution of location information. According to an embodiment, the electronic device may determine a value obtained by reducing the radius r of the current geofence 1010 to the critical radius 1020 as a radius R of a changed geofence 1030.

FIG. 10 illustrates the example that the critical radius 1020 is set to the radius for covering the entire location center distribution of the location information, but example embodiments are not limited thereto. According to an embodiment, if there is an outlier deviating from the critical radius in the location center distribution of the received location information, the electronic device may reduce the geofence, based on the other location center distribution than the corresponding outlier.

By decreasing the geofence, the electronic device according to example embodiments may perform a stable geofence service based on the improved location accuracy radius.

Figure 11:
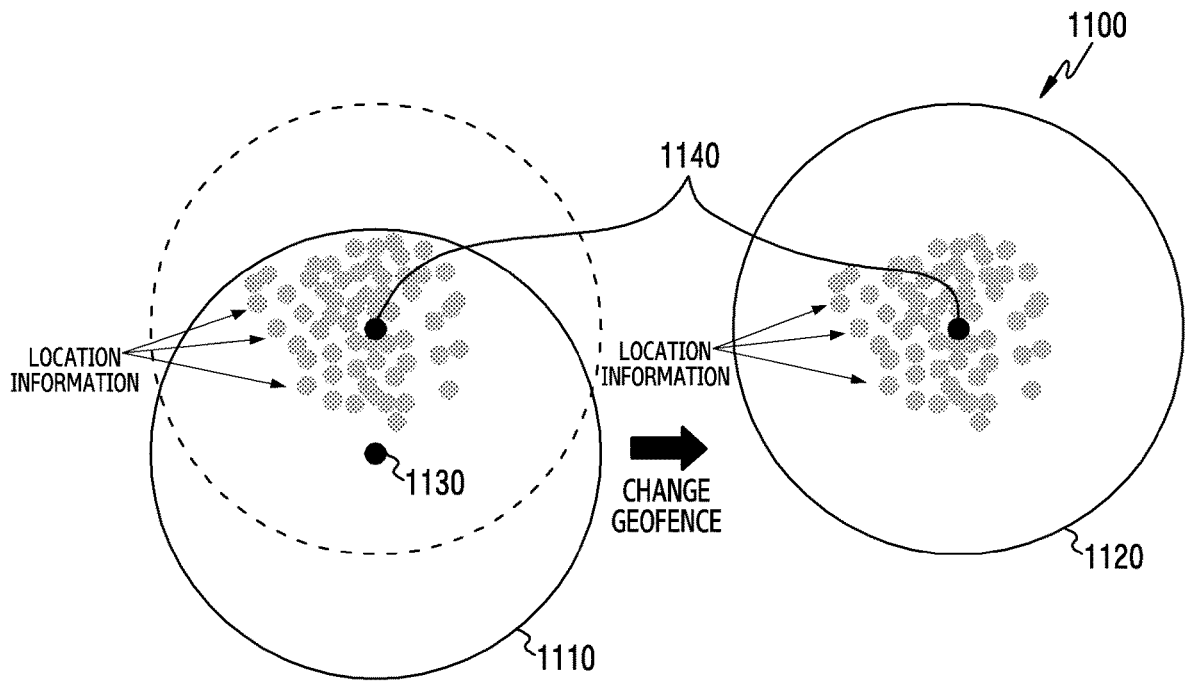
FIG. 11 illustrates an example of a geofence center changing operation based on location information according to an example embodiment.

FIG. 11 illustrates an example 1100 of an operation for changing a geofence center based on location information according to an embodiment. An electronic device of FIG. 11 represents the electronic device 1401 of FIG. 14 hereafter.

Referring to FIG. 11, the electronic device may change the center of the geofence based on the location information. According to an embodiment, while a radius of a current geofence 1110 exceeds the mean value of the location accuracy radii, if the location center distribution included in the critical radius of the geofence is biased in a specific direction, the electronic device may change a center 1130 of the current geofence 1110. According to an embodiment, the location center distribution may include a location center distribution collected within the geofence. According to an embodiment, the electronic device may determine a center 1140 of a changed geofence 1120, by moving the center 1130 of the current geofence 1110 in the biased specific direction.

For example, it is assumed that the electronic device receives a geofence service, and the location center distribution of the location information within the current geofence 1110 of the electronic device is biased in a specific direction (e.g., 12 o'clock position). Based on the above-mentioned assumption, the electronic device may change the center 1130 of the current geofence 1110. The electronic device may determine the center 1140 of the changed geofence 1120, by moving the center 1130 of the current geofence 1110 in the biased specific direction (e.g., 12 o'clock position).

The electronic device according to the present disclosure may perform a stable geofence service based on the improved location accuracy radius, by changing the center of the geofence.

FIG. 9 through FIG. 11 have illustrated the example of increasing the geofence radius, decreasing the geofence radius or changing the geofence center, but embodiments of the present disclosure are not limited thereto. According to an embodiment, the electronic device may change the configuration of the geofence, by overlappingly performing at least two or more schemes of increasing the geofence radius, decreasing the geofence radius, or changing the geofence center. In addition, FIG. 9 through FIG. 11 have illustrated the examples of the geofence which has the circular shape, but embodiments of the present disclosure are not limited thereto. According to an embodiment, the geofence may be set to various shapes rather than the circle, based on the location information.

Figure 12:
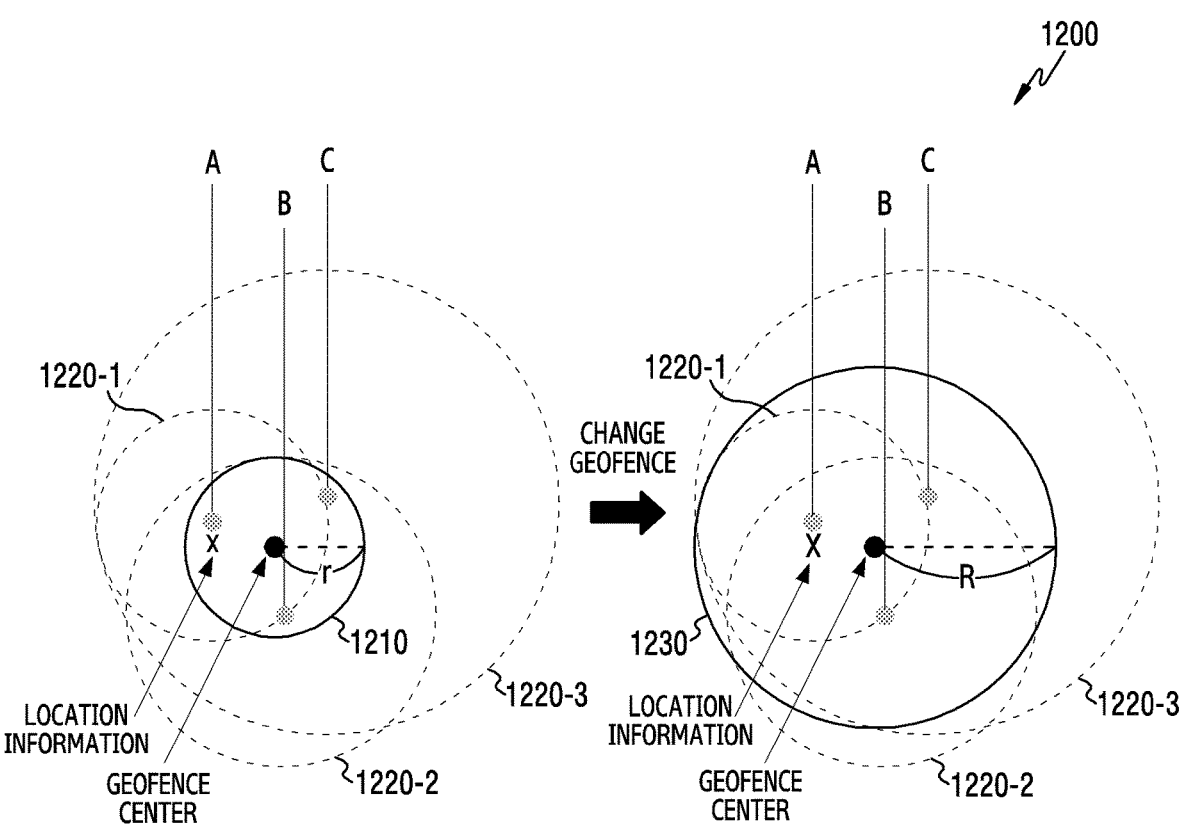
FIG. 12 illustrates an example of a geofence changed based on location information according to an example embodiment.

FIG. 12 illustrates an example 1200 of a geofence changed based on location information according to an embodiment. An electronic device of FIG. 12 represents the electronic device 1401 of FIG. 14 hereafter.

Referring to FIG. 12, the electronic device receives a geofence service. It is assumed that an area in which the electronic device is currently located is an area of relatively low location accuracy of location information. Hereinafter, an embodiment in which the electronic device changes the configuration of the geofence to prevent or reduce likelihood of a malfunction or no operation of geofence event notification based on the electronic device location information will be described based on the above-mentioned assumption. Location information "A, B, C" having location accuracy radii 1220-1, 1220-2, and 1220-3 greater than a first radius r of a current geofence 1210 is received in sequence.

Before the geofence configuration is changed, if the location information "A" is received, since the first radius r of the current geofence 1210 is smaller than the location accuracy radius 1220-1 of the received location information "A", the electronic device may not identify the location information "A" inside the geofence 1210. If the location information "B" is received, since the first radius r of the current geofence 1210 is smaller than the location accuracy radius 1220-2 of the received location information "B", the electronic device may not identify the location information "B" currently inside the geofence 1210. If the location information "C" is received, since the first radius r of the current geofence 1210 is smaller than the location accuracy radius 1220-2 of the received location information "C", the electronic device may not identify the location information "C" currently inside the geofence 1210. Hence, in the left side of FIG. 12, the electronic device, which may not identify whether the electronic device is located inside the geofence based on the location information "A, B, C", may not stably perform the geofence service.

According to an embodiment, the electronic device may change the first radius r of the current geofence 1210 based on at least one of a mean value, a standard deviation or their combination of location accuracy radii of the location information "A, B, C". For example, the electronic device may determine a value obtained by adding the mean value and the standard deviation of the location accuracy radii of the location information "A, B, C" to the first radius r of the current geofence 1210 as a first radius R of a changed geofence 1230.

According to an embodiment, the electronic device may change the first radius r of the current geofence 1210 based on at least one of a location accuracy radius corresponding to a specific quantile point (e.g., Q3) with respect to the location accuracy radii of the location information "A, B, C", an IQR value or a combination thereof. For example, the electronic device may determine a value obtained by adding the location accuracy radius corresponding to the specific quantile point (e.g., Q3) with respect to the location accuracy radii of the location information "A, B, C" and the IQR value to the first radius r of the current geofence 1210 as a second radius R of the changed geofence 1230.

After the configuration of the geofence is changed, if the location information "A" is received, the electronic device may identify the location information "A" inside the current geofence 1210, because the first radius r of the changed geofence 1230 is greater than the location accuracy radius 1220-1 of the received location information "A". If receiving the location information "B", the electronic device may identify the location information "B" inside the current geofence 1210, because the first radius r of the changed geofence 1230 is greater than the location accuracy radius 1220-2 of the received location information "B". If receiving the location information "C", the electronic device may identify the location information "C" inside the current geofence 1210, because the first radius r of the changed geofence 1230 is smaller than the location accuracy radius 1220-2 of the received location information "C". Thus, the electronic device according to the present disclosure may accurately determine whether the location of the electronic device is included in the geofence, by changing the geofence configuration even in an area of relatively low location accuracy. The electronic device may stably perform the geofence service based on the accurate determination on the electronic device location.

Figure 13:
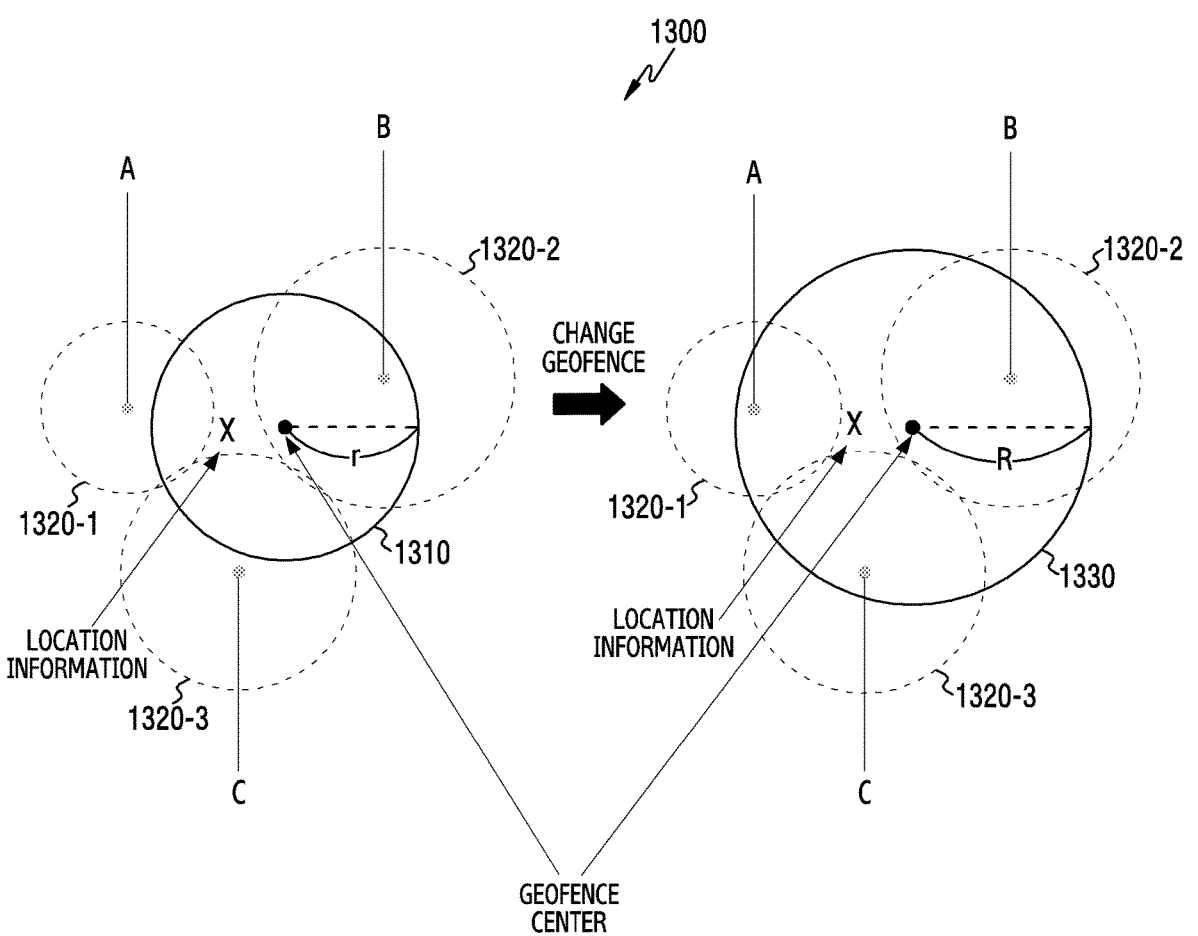
FIG. 13 illustrates another example of a geofence changed based on location information according to an example embodiment.

FIG. 13 illustrates another example 1300 of a geofence changed based on location information according to an embodiment. An electronic device of FIG. 13 represents the electronic device 1401 of FIG. 14 hereafter.

Referring to FIG. 13, it is assumed that the electronic device provides a geofence service, and an area in which the electronic device is currently located is an area of relatively low location accuracy of location information. In addition, it is assumed that the electronic device is located within a geofence 1310, and sequentially receives location information "A, B, C" having location accuracy radii 1320-1, 1320-2, and 1320-3. Hereinafter, an embodiment in which the electronic device changes geofence configuration to prevent or reduce chance of an unnecessary geofence event notification based on the location information of the electronic device shall be described based on the above-stated assumption.

Before the geofence configuration is changed, if the location information "A" is received, "A" is outside the current geofence 1310 and accordingly an application of the electronic device generates a geofence event notification "out". If the location information "B" is received, "B" is inside the current geofence 1310 and accordingly the application of the electronic device generates a geofence event notification "in". If the location information "C" is received, "C" is outside the current geofence 1310 and accordingly the application of the electronic device generates a geofence event notification "out". In the left side of FIG. 13, the electronic device needs to receive an unnecessary geofence event notification (e.g., in or out) because the actual current location of the electronic device is inside the geofence 1310 but a first radius r of the current geofence 1310 is set to be small. According to an embodiment, the electronic device may change the first radius r of the current geofence 1310 based on at least one of a mean value, a standard deviation or their combination for the location accuracy radii of the location information "A, B, C". For example, the electronic device may determine a value obtained by adding the mean value and the standard deviation of the location accuracy radii of the location information "A, B, C" to the first radius r of the current geofence 1310 as a second radius R of a changed geofence 1330. According to an embodiment, the electronic device may change the first radius r of the current geofence 1210 based on at least one of a location accuracy radius corresponding to a specific quantile point (e.g., Q3) with respect to the location accuracy radii of the location information "A, B, C", the IQR value or a combination thereof. For example, the electronic device may determine a value obtained by adding the location accuracy radius corresponding to the specific quantile point (e.g., Q3) with respect to the location accuracy radii of the location information "A, B, C" and the IQR value to the first radius r of the current geofence 1310 as a second radius R of the changed geofence 1330.

After the configuration of the geofence is changed, if the location information "A" is received, the electronic device may determine that the geofence in state is maintained because "A" is in the current changed geofence 1330. After the configuration of the geofence is changed, if the location information "A" is received, the electronic device may determine that the geofence in state is maintained and thus the application of the electronic device may not generate a geofence event notification.

If the location information "B" is received, "B" is in the current changed geofence 1330 and accordingly it may be determined to maintain the geofence in state. After the configuration of the geofence is changed, if the location information "B" is received, the electronic device may determine that the geofence in state is maintained and accordingly the application of the electronic device may not generate a geofence event notification.

If the location information "C" is received, "C" is in the current changed geofence 1330 and accordingly it may be determined that the geofence in state is maintained. After the configuration of the geofence is changed, if the location information "C" is received, the electronic device may determine that the geofence in state is maintained and accordingly the application of the electronic device may not generate a geofence event notification.

Thus, by adaptively changing the geofence even in the area of the relatively low location accuracy, the electronic device according to the present disclosure may prevent or reduce power consumption waste due to unnecessary notification and stably perform the geofence service.

FIG. 14 is a block diagram illustrating an electronic device 1401 in a network environment 1400 according to various embodiments.

Referring to FIG. 14, the electronic device 1401 in the network environment 1400 may communicate with an electronic device 1402 via a first network 1498 (e.g., a short-range wireless communication network), or at least one of an electronic device 1404 or a server 1408 via a second network 1499 (e.g., a long-range wireless communication network). According to an embodiment, the electronic device 1401 may communicate with the electronic device 1404 via the server 1408. According to an embodiment, the electronic device 1401 may include a processor 1420, memory 1430, an input module 1450, a sound output module 1455, a display module 1460, an audio module 1470, a sensor module 1476, an interface 1477, a connecting terminal 1478, a haptic module 1479, a camera module 1480, a power management module 1488, a battery 1489, a communication module 1490, a subscriber identification module (SIM) 1496, or an antenna module 1497. In some embodiments, at least one of the components (e.g., the connecting terminal 1478) may be omitted from the electronic device 1401, or one or more other components may be added in the electronic device 1401. In some embodiments, some of the components (e.g., the sensor module 1476, the camera module 1480, or the antenna module 1497) may be implemented as a single component (e.g., the display module 1460).

The processor 1420 may execute, for example, software (e.g., a program 1440) to control at least one other component (e.g., a hardware or software component) of the electronic device 1401 coupled, directly or indirectly, with the processor 1420, and may perform various data processing or computation. According to an embodiment, as at least part of the data processing or computation, the processor 1420 may store a command or data received from another component (e.g., the sensor module 1476 or the communication module 1490) in volatile memory 1432, process the command or the data stored in the volatile memory 1432, and store resulting data in non-volatile memory 1434. According to an embodiment, the processor 1420 may include a main processor 1421 (e.g., a central processing unit (CPU) or an application processor (AP)), or an auxiliary processor 1423 (e.g., a graphics processing unit (GPU), a neural processing unit (NPU), an image signal processor (ISP), a sensor hub processor, or a communication processor (CP)) that is operable independently from, or in conjunction with, the main processor 1421. For example, when the electronic device 1401 includes the main processor 1421 and the auxiliary processor 1423, the auxiliary processor 1423 may be adapted to consume less power than the main processor 1421, or to be specific to a specified function. The auxiliary processor 1423 may be implemented as separate from, or as part of the main processor 1421.

The auxiliary processor 1423 may control at least some of functions or states related to at least one component (e.g., the display module 1460, the sensor module 1476, or the communication module 1490) among the components of the electronic device 1401, instead of the main processor 1421 while the main processor 1421 is in an inactive (e.g., sleep) state, or together with the main processor 1421 while the main processor 1421 is in an active state (e.g., executing an application). According to an embodiment, the auxiliary processor 1423 (e.g., an image signal processor or a communication processor) may be implemented as part of another component (e.g., the camera module 1480 comprising a camera or the communication module 1490 comprising communication circuitry) functionally related to the auxiliary processor 1423. According to an embodiment, the auxiliary processor 1423 (e.g., the neural processing unit) may include a hardware structure specified for artificial intelligence model processing. An artificial intelligence model may be generated by machine learning. Such learning may be performed, e.g., by the electronic device 1401 where the artificial intelligence is performed or via a separate server (e.g., the server 1408). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 1430 may store various data used by at least one component (e.g., the processor 1420 or the sensor module 1476) of the electronic device 1401. The various data may include, for example, software (e.g., the program 1440) and input data or output data for a command related thereto. The memory 1430 may include the volatile memory 1432 or the non-volatile memory 1434.

The program 1440 may be stored in the memory 1430 as software, and may include, for example, an operating system (OS) 1442, middleware 1444, or an application 1446.

The input module 1450 may receive a command or data to be used by another component (e.g., the processor 1420) of the electronic device 1401, from the outside (e.g., a user) of the electronic device 1401. The input module 1450 may include, for example, a microphone, a mouse, a keyboard, a key (e.g., a button), or a digital pen (e.g., a stylus pen).

The sound output module 1455 may output sound signals to the outside of the electronic device 1401. The sound output module 1455 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 1460 may visually provide information to the outside (e.g., a user) of the electronic device 1401. The display module 1460 may include, for example, a display, a hologram device, or a projector and control circuitry to control a corresponding one of the display, hologram device, and projector. According to an embodiment, the display module 1460 may include a touch sensor adapted to detect a touch, or a pressure sensor adapted to measure the intensity of force incurred by the touch.

The audio module 1470 may convert a sound into an electrical signal and vice versa. According to an embodiment, the audio module 1470 may obtain the sound via the input module 1450, or output the sound via the sound output module 1455 or a headphone of an external electronic device (e.g., an electronic device 1402) directly (e.g., wiredly) or wirelessly coupled with the electronic device 1401.

The sensor module 1476 may detect an operational state (e.g., power or temperature) of the electronic device 1401 or an environmental state (e.g., a state of a user) external to the electronic device 1401, and then generate an electrical signal or data value corresponding to the detected state. According to an embodiment, the sensor module 1476 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 1477 may support one or more specified protocols to be used for the electronic device 1401 to be coupled with the external electronic device (e.g., the electronic device 1402) directly (e.g., wiredly) or wirelessly. According to an embodiment, the interface 1477 may include, for example, a high definition multimedia interface (HDMI), a universal serial bus (USB) interface, a secure digital (SD) card interface, or an audio interface.

A connecting terminal 1478 may include a connector via which the electronic device 1401 may be physically connected, directly or indirectly, with the external electronic device (e.g., the electronic device 1402). According to an embodiment, the connecting terminal 1478 may include, for example, a HDMI connector, a USB connector, a SD card connector, or an audio connector (e.g., a headphone connector).

The haptic module 1479 may convert an electrical signal into a mechanical stimulus (e.g., a vibration or a movement) or electrical stimulus which may be recognized by a user via his tactile sensation or kinesthetic sensation. According to an embodiment, the haptic module 1479 may include, for example, a motor, a piezoelectric element, or an electric stimulator.

The camera module 1480 may capture a still image or moving images. According to an embodiment, the camera module 1480 may include one or more lenses, image sensors, image signal processors, or flashes.

The power management module 1488 may manage power supplied to the electronic device 1401. According to an embodiment, the power management module 1488 may be implemented as at least part of, for example, a power management integrated circuit (PMIC).

The battery 1489 may supply power to at least one component of the electronic device 1401. According to an embodiment, the battery 1489 may include, for example, a primary cell which is not rechargeable, a secondary cell which is rechargeable, or a fuel cell.

The communication module 1490, comprising communication circuitry, may support establishing a direct (e.g., wired) communication channel or a wireless communication channel between the electronic device 1401 and the external electronic device (e.g., the electronic device 1402, the electronic device 1404, or the server 1408) and performing communication via the established communication channel. The communication module 1490 may include one or more communication processors that are operable independently from the processor 1420 (e.g., the application processor (AP)) and supports a direct (e.g., wired) communication or a wireless communication. According to an embodiment, the communication module 1490 may include a wireless communication module 1492 (e.g., a cellular communication module, a short-range wireless communication module, or a global navigation satellite system (GNSS) communication module) or a wired communication module 1494 (e.g., a local area network (LAN) communication module or a power line communication (PLC) module). A corresponding one of these communication modules may communicate with the external electronic device via the first network 1498 (e.g., a short-range communication network, such as Bluetooth™, wireless-fidelity (Wi-Fi) direct, or infrared data association (IrDA)) or the second network 1499 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 1492 may identify and authenticate the electronic device 1401 in a communication network, such as the first network 1498 or the second network 1499, using subscriber information (e.g., international mobile subscriber identity (IMSI)) stored in the subscriber identification module 1496.

The wireless communication module 1492, comprising communication circuitry, may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 1492 may support a high-frequency band (e.g., the mmWave band) to achieve, e.g., a high data transmission rate. The wireless communication module 1492 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 1492 may support various requirements specified in the electronic device 1401, an external electronic device (e.g., the electronic device 1404), or a network system (e.g., the second network 1499). According to an embodiment, the wireless communication module 1492 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 1497 may transmit or receive a signal or power to or from the outside (e.g., the external electronic device) of the electronic device 1401. According to an embodiment, the antenna module 1497 may include an antenna including a radiating element composed of a conductive material or a conductive pattern formed in or on a substrate (e.g., a printed circuit board (PCB)). According to an embodiment, the antenna module 1497 may include a plurality of antennas (e.g., array antennas). In such a case, at least one antenna appropriate for a communication scheme used in the communication network, such as the first network 1498 or the second network 1499, may be selected, for example, by the communication module 1490 (e.g., the wireless communication module 1492) from the plurality of antennas. The signal or the power may then be transmitted or received between the communication module 1490 and the external electronic device via the selected at least one antenna. According to an embodiment, another component (e.g., a radio frequency integrated circuit (RFIC)) other than the radiating element may be additionally formed as part of the antenna module 1497.

According to various embodiments, the antenna module 1497 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 1401 and the external electronic device 1404 via the server 1408 coupled, directly or indirectly, with the second network 1499. Each of the electronic devices 1402 or 1404 may be a device of a same type as, or a different type, from the electronic device 1401. According to an embodiment, all or some of operations to be executed at the electronic device 1401 may be executed at one or more of the external electronic devices 1402, 1404, or 1408. For example, if the electronic device 1401 should perform a function or a service automatically, or in response to a request from a user or another device, the electronic device 1401, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 1401. The electronic device 1401 may provide the outcome, with or without further processing of the outcome, as at least part of a reply to the request. To that end, a cloud computing, distributed computing, mobile edge computing (MEC), or client-server computing technology may be used, for example. The electronic device 1401 may provide ultra low-latency services using, e.g., distributed computing or mobile edge computing. In another embodiment, the external electronic device 1404 may include an internet-of-things (IoT) device. The server 1408 may be an intelligent server using machine learning and/or a neural network. According to an embodiment, the external electronic device 1404 or the server 1408 may be included in the second network 1499. The electronic device 1401 may be applied to intelligent services (e.g., smart home, smart city, smart car, or healthcare) based on 5G communication technology or IoT-related technology.

As stated above, an electronic device according to an embodiment of the present disclosure may include a communication circuit and a processor electrically connected, directly or indirectly, to the communication circuit, the processor may be configured to receive location information of the electronic device, identify whether an amount of the location information is greater than or equal to a reference amount, and change a geofence configuration based on a location accuracy radius of the location information, if the location information amount is equal to or greater than the reference amount, and the location accuracy radius may be determined based on a probability that the electronic device is actually located in a specific area.

According to an embodiment, to change the geofence configuration based on the location accuracy radius of the location information, the processor may be configured to identify whether the geofence radius exceeds a reference value of the location accuracy radius, and increase the radius of the geofence, if the geofence radius does not exceed the reference value of the location accuracy radius.

According to an embodiment, to increase the geofence radius, the processor may be configured to increase the geofence radius based on at least one of a mean value, or a standard deviation of the location accuracy radii.

According to an embodiment, to increase the geofence radius, the processor may be configured to arrange the location accuracy radii based on a size, identify a location accuracy radius of a specific rank among the arranged location accuracy radii, and increase the geofence radius based on at least one of the location accuracy radius of the specific rank or an IQR of the location accuracy radius.

According to an embodiment, the processor may be configured further to maintain the geofence, if the location information amount is less than the reference amount.

According to an embodiment, the reference value of the location accuracy radius may include any one of the mean value or a median of the location accuracy radii.

According to an embodiment, the processor may be configured further to, if the geofence radius exceeds the reference value of the location accuracy radius, identify whether a distribution of the location information is included in a critical range, and if the location information distribution is included in the critical range, identify whether the location information distribution is biased in a specific direction.

According to an embodiment, the processor may be configured further to, reduce the geofence radius to the critical range, if the location information distribution is not biased in the specific direction, and a radius size of the critical range may be smaller than the geofence radius.

According to an embodiment, the processor may be configured further to change a center of the geofence in the specific direction, if the location information distribution is biased in the specific direction.

According to an embodiment, the location information may include at least one of global navigation satellite system (GNSS) information, cellular positioning system (CPS) information or wi-fi positioning system (WPS) information.

An operating method of an electronic device according to an embodiment of the present disclosure may include receiving location information of the electronic device, identifying whether an amount of the location information is equal to or greater than a reference amount, and in case that the location information amount is equal to or greater than the reference amount, changing a geofence configuration based on a location accuracy radius of the location information, and the location accuracy radius may be determined based on a probability that the electronic device is actually located in a specific area.

According to an embodiment, changing the geofence configuration based on the location accuracy radius of the location information may include identifying whether the geofence radius exceeds a reference value of the location accuracy radius, and increasing the geofence radius, if the geofence does radius not exceed the reference value of the location accuracy radius.

According to an embodiment, increasing the geofence radius may include increasing the geofence radius based on at least one of a mean value and a standard deviation of the location accuracy radius.

According to an embodiment, increasing the geofence radius may include arranging the location accuracy radius based on a size, identifying a location accuracy radius of a specific rank among the arranged accuracy radius, and increasing the geofence radius based on at least one of the location accuracy radius of the specific rank or an IQR of the location accuracy radius. "Based on" as used herein covers based at least on.

According to an embodiment, the method may further include, if the location information amount is less than the reference amount, maintaining the geofence.

According to an embodiment, the reference value of the location accuracy radius may include any one of the mean value or a median of the location accuracy radius.

According to an embodiment, the method may further include, if the geofence radius exceeds the reference value of the location accuracy radius, identifying whether a distribution of the location information is included in a critical range, and if the location information distribution is included in the critical range, identifying whether the location information distribution is biased in a specific direction.

According to an embodiment, the method may further include, reducing the geofence radius to the critical range, if the location information distribution is not biased in the specific direction, and a radius size of the critical range may be smaller than the geofence radius.

According to an embodiment, the method may further include, changing a center of the geofence in the specific direction, if the location information distribution is biased in the specific direction.

According to an embodiment, the location information may include at least one of global navigation satellite system (GNSS) information, cellular positioning system (CPS) information or wi-fi positioning system (WPS) information.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various example embodiments and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via at least a third element(s).

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC). Thus, each "module" herein may comprise circuitry.

Various embodiments as set forth herein may be implemented as software (e.g., the program 1440) including one or more instructions that are stored in a storage medium (e.g., internal memory 1436 or external memory 1438) that is readable by a machine (e.g., the electronic device 1401). For example, a processor (e.g., the processor 1420) of the machine (e.g., the electronic device 1401) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

The invention claimed is:

1. An electronic device comprising:
a communication circuit;
at least one processor, comprising processing circuitry, electrically connected to the communication circuit; and
memory storing instructions that, when executed by the at least one processor individually and/or collectively, cause the electronic device to:
identify first information on locations of the electronic device and second information on probability distances from a reference location of a geofence, wherein the probability distances are determined such that a probability that the locations are within the probability distances respectively is equal to a designated value,
identify whether a number of the locations is equal to or greater than a designated number configured for the geofence with a first range,
in case that the number of the locations is equal to or greater than the designated number, identify a second range based on the probability distances, and
change a range of the geofence from the first range to the second range.

2. The electronic device of claim 1, wherein the first range corresponds to a first radius and the second range corresponds to a second radius,
wherein the instructions, when executed by the at least one processor individually and/or collectively, cause the electronic device to:
identify the second radius greater than the first radius, based on at least one of a mean value, or a standard deviation of the probability distances, and
increase a radius of the range of the geofence from the first radius to the second radius.

3. The electronic device of claim 1, wherein the first range corresponds to a first radius and the second range corresponds to a second radius,
wherein the instructions, when executed by the at least one processor individually and/or collectively, cause the electronic device to:
identify the second radius greater than the first radius, based on an interquartile range (IQR) of the probability distances, and
increase a radius of the range of the geofence from the first radius to the second radius.

4. The electronic device of claim 1, wherein the instructions, when executed by the at least one processor individually and/or collectively, cause the electronic device to:
in case that the number of the locations is less than the designated number, maintain the range of the geofence.

5. The electronic device of claim 1, wherein the first information includes at least one of global navigation satellite system (GNSS) information, cellular positioning system (CPS) information or wi-fi positioning system (WPS) information.

6. The electronic device of claim 1, wherein the instructions, when executed by the at least one processor individually and/or collectively, cause the electronic device to:
identify first probability distances greater than a reference distance for an accuracy among the probability distances, and
identify the second range based on second probability distances remaining after excluding the first probability distances from the probability distances.

7. The electronic device of claim 1, wherein the instructions, when executed by the at least one processor individually and/or collectively, cause the electronic device to:
identify whether a distribution of the locations is biased in a specific direction, and
in case that the distribution is biased in the specific direction, change the reference location corresponding to a center of the geofence.

8. The electronic device of claim 1, wherein the first range corresponds to a first radius and the second range corresponds to a second radius,
wherein the instructions, when executed by the at least one processor individually and/or collectively, cause the electronic device to:
identify the second radius smaller than the first radius, based on at least one of a mean value, or a standard deviation of the probability distances, and
decrease a radius of the range of the geofence from the first radius to the second radius.

9. The electronic device of claim 1, wherein, in case that the locations of the electronic device are spaced farther apart than a specific distance from the reference location, the range of the geofence is maintained.

10. A method performed by an electronic device, the method comprising:
identifying first information on locations of the electronic device and second information on probability distances from a reference location of a geofence, wherein the probability distances are determined such that a probability that the locations are within the probability distances respectively is equal to a designated value;
identifying whether a number of the locations is equal to or greater than a designated number configured for the geofence with a first range;
in case that the number of the locations is equal to or greater than the designated number, identifying a second range based on the probability distances; and
changing a range of the geofence from the first range to the second range.

11. The method of claim 10, wherein the first range corresponds to a first radius and the second range corresponds to a second radius,
wherein changing the range comprises:
identifying the second radius greater than the first radius, based on at least one of a mean value, or a standard deviation of the probability distances, and
increasing a radius of the range of the geofence from the first radius to the second radius.

12. The method of claim 10, wherein the first range corresponds to a first radius and the second range corresponds to a second radius, wherein changing the range comprises:

identifying the second radius greater than the first radius, based on an interquartile range (IQR) of the probability distances, and increasing a radius of the range of the geofence from the first radius to the second radius.

13. The method of claim 10, further comprising:

in case that the number of the locations is less than the designated number, maintaining the range of the geofence.

14. The method of claim 10, wherein the first information includes at least one of global navigation satellite system (GNSS) information, cellular positioning system (CPS) information or wi-fi positioning system (WPS) information.

15. The method of claim 10, further comprising:

identifying first probability distances greater than a reference distance for an accuracy among the probability distances, and identifying the second range based on second probability distances remaining after excluding the first probability distances from the probability distances.

16. The method of claim 10, further comprising:

identifying whether a distribution of the locations is biased in a specific direction, and in case that the distribution is biased in the specific direction, changing the reference location corresponding to a center of the geofence.

17. The method of claim 10, wherein the first range corresponds to a first radius and the second range corresponds to a second radius, wherein the method further comprises:

identifying the second radius smaller than the first radius, based on at least one of a mean value, or a standard deviation of the probability distances, and decreasing a radius of the range of the geofence from the first radius to the second radius.

18. The method of claim 10, wherein, in case that the locations of the electronic device are spaced farther apart than a specific distance from the reference location, the range of the geofence is maintained.

* * * * *